(12) United States Patent
Shufrun et al.

(10) Patent No.: US 7,808,909 B2
(45) Date of Patent: Oct. 5, 2010

(54) METHOD AND A SYSTEM FOR MATCHING BETWEEN NETWORK NODES

(75) Inventors: Victor Shufrun, Kfar Adumim-Doar-Na Mizrach Binjamin (IL); Gal A. Kaminka, Kfar-Saba (IL); Sarit Kraus, Givat Shmuel (IL); Claudia V. Goldman-Shenhar, Mevasseret Zion (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 403 days.

(21) Appl. No.: 11/905,480

(22) Filed: Oct. 1, 2007

(65) Prior Publication Data

US 2009/0086745 A1 Apr. 2, 2009

(51) Int. Cl.
 *G01R 31/08* (2006.01)
(52) U.S. Cl. ............... 370/236; 370/252; 463/1; 463/25; 463/31; 463/42
(58) Field of Classification Search ............ 370/236, 370/248, 252, 254, 389; 463/1, 7, 16, 17, 463/20, 29, 31, 35, 39
See application file for complete search history.

(56) References Cited

U.S. PATENT DOCUMENTS

2004/0260701 A1\* 12/2004 Lehikoinen et al. .......... 707/10
2006/0258417 A1\* 11/2006 Crawford et al. ............. 463/1
2009/0210495 A1\* 8/2009 Wolfson et al. ............. 709/205

OTHER PUBLICATIONS

Dimakopoulos et al., "Performance Analysis of Distributed Search in Open Agent Systems", 2003, IEEE (IPDPS'03).\*
Dimakopoulos et al., "On the Performance of Flooding-Based Resource Discovery", 2006 IEEE Computer Society, pp. 1242-1252.\*
Banaei-Kashani et al. "Criticality-Based Analysis and Design of Unstructured Peer-to-Peer Networks as Complex Systems," Proc. GP2PC '03, Third Int'l Workshop Global and Peerto-Peer Computing, 2003.
Ben-Ami et al. "A Comparative Evaluation of Agent Location Mechanisms in Large Scale Mas", AAMAS: P. 339.346, ACM, 2005.
Ben-Ami et al. "Evaluation of Distributed and Centralized Agent Location Mechanisms". CIA, vol. 2446 of Lecture Notes in Computer Science: p. 264.278, Springer, 2002.

(Continued)

*Primary Examiner*—Jayanti K Patel
*Assistant Examiner*—Jung Park

(57) ABSTRACT

A multi-node network that comprises a plurality of nodes, at least one of the nodes comprises a local cache for storing a plurality of matching indications at least some of which associated with a potential node. A receiving node of the plurality of nodes that is configured for receiving a matching request having a requested matching indication associated with an address of an additional node of the plurality of nodes. The receiving node is configured for identifying a match between the receiving node and at least one of the associated potential nodes by matching the requested matching indication and the stored matching indications and for informing one or more of the receiving nodes and the associated nodes about the match.

25 Claims, 15 Drawing Sheets

OTHER PUBLICATIONS

Clarke et al. "Freenet: A distributed Anonymous Information Storage and Retrieval System". Lecture Notes in Computer Science, 2009 : p. 46-66, 2001.

Dimakopoulos et al. "On the Performance of Coding-Based Resource Discovery", IEEE Trans. Parallel Distrib. Syst., 17(11):1242.1252, 2006.

Dimakopoulos et al. "Performance Analysis of Distributed Search in Open Agent Systems," Proc. Int'l Parallel and Distributed Processing Symp, 2003.

Kalogeraki et al. "A Local Mechanism for Peer-to Peer Networks", Proc. 11th ACM. Conf. Information and Knowledge Management (CIKM), 2002.

* cited by examiner

METHOD AND A SYSTEM FOR MATCHING BETWEEN NETWORK NODES

FIELD AND BACKGROUND OF THE INVENTION

In some embodiments of the present invention relates to a method and a multi-node system for matching between nodes and, more particularly, but not exclusively to a method and a distributed system for finding a match between static and dynamic network nodes, such as mobile communication terminals.

In multi-agent networks (MANs), such as multi-agent systems (MASs), nodes may cooperate with one another. In such a system, a matchmaking process is used for allowing two or more nodes to find each other and/or to obtain services, to create groups, and/or to form coalition from one or more nodes which are connected to the network.

Currently, three general approaches are commonly used for addressing the matchmaking problem. In the first approach, which may be referred to as a centralized approach or yellow pages approach, a node, such as a central server, hosts the addresses of all the nodes in the system. In use, a node that wants to access a certain kind of resource that is hosted in one of the nodes requests from the central server to provide it with an address of the node. The central server checks its database and informs the node about the matching resources.

The second approach uses a number of nodes, which may be referred to as middle nodes and/or super peers, which are used for interfacing between clients and resources. In use, a client node, which wants to access a certain kind of resource node, requests the nearest middle node to provide it with an address of such a resource node. The middle node tries to match such a resource and forwards the request to other middle nodes if it fails. Such an approach may be used to overcome the scalability problems of the first approach.

The third approach uses all the nodes as sources of information. In use, each node publishes all the services it provides and allows other nodes that search for a resource or a match to access independently the published services. In the third approach, nodes share information with one another without using a central server and/or middle nodes that manage the traffic of messages between the nodes. The third approach provides a dynamic matchmaking process, wherein nodes may leave, reenter, and change their address without updating any other node of the system, such as a central server or a middle node. Such an approach can be implemented in an open MAS, wherein the number of agents is not fixed, the structure is not static and interactions and relationships between agents are not fixed.

An evaluation and a comparison analysis of these approaches are provided in D. Ben-Ami et al, *Evaluation of distributed and centralized agent location mechanisms*. In M. Klusch, S. Ossowski, and O. Shehory, editors, *CIA, volume 2446 of Lecture Notes in Computer Science*, pages 264.278, Springer, 2002, in D. Ben-Ami et al, *A comparative evaluation of agent location mechanisms in large scale mas*, in F. Dignum, V Dignum, S. Koenig, S. Kraus, M. P. Singh, and M. Wooldridge, editors, *AAMAS*, pages 339.346, ACM, 2005, and in I. Clarke, O. Sandberg, B. Wiley, and T. W. Hong. *Freenet: A distributed anonymous information storage and retrieval system. Lecture Notes in Computer Science*, 2009: 46.66, 2001, the disclosures of which are incorporated herein by reference.

SUMMARY OF THE INVENTION

Some of the present embodiments comprise a multi-agent networks (MAN), such as a multi-agent system (MAS), which is optionally an open MAS, an agent of the MAN, which may be referred to as a node and/or a network node, and a method for matching between at least two network nodes of the MAN. One or more of the network nodes of the MAN is designed for receiving and/or creating a request for a match with one or more potential nodes in the MAN and for forwarding the matching request to the potential nodes. In addition, the network node, which functions as a part of a system, has a local matching cache that allows it to store a plurality of matching indications, at least some of which associated with one or more potential network nodes which meet the matching indications criteria, separately or jointly, as described below. The network node, optionally upon the receipt of the matching request, identifies the requested match by matching between the stored and the received matching indications and informs one or more of the matched nodes about the match. In such a manner, the network node allows a matched node to establish a communication session, such as a chat and/or a gaming session, a resource sharing, a resource and/or a service allocating, and/or a resource and/or a service reception, with another matched node.

For example, the network node may receive a request for a match that defines a readiness to participate in a gaming session as a matching indication. The stored matching indications allow the network node to assist in the matching between two or more nodes of the MAN that requests to participate in the gaming session. When the network node receives a matching request, it matches it, optionally using a managing module, with the matching indications which are stored in the local matching cache. Then, the network node uses a communication transmitter to inform the node and/or one or more of the potential nodes which are associated with the matching indications in the local matching cache about the match. Optionally, the network node uses the source indicator of the additional matching request and the source indicators, which are locally stored, to inform the node that sent the additional matching request and/or the one or more potential nodes. In such a manner, the node that sent the matching request and the potential nodes may find each other and establish a common activity.

Some of the present embodiments comprise a method for matching between at least two network nodes of a MAN. Initially, a plurality of matching requests for participating and/or initiating a certain activity is stored. At least one of the matching requests includes a source indicator, as described above, and a matching indication that defines the certain activity. Then, an additional matching request with a source indicator and a matching indication is received. Now, the matching indication of the additional matching request is matched with one or more of the stored matching indications. After a matched has been found, at least one of the senders of the additional matching request and one or more of the stored matching requests are informed about the match. In such a manner, nodes may establish a connection that allows them to participate in a common activity, such as a gaming session or another activity, as described below.

According to one aspect of the present invention there is provided a MAS that comprises a plurality of nodes, each the node comprising a local cache configured for storing a plurality of matching indications each associated with a potential node. A receiving node of the plurality of nodes is configured for receiving a matching request having a requested matching indication associated with an address of an additional node of the plurality of nodes. The receiving node is configured for identifying a match between the receiving node and at least one of the associated potential nodes by matching the requested matching indication and the stored matching indications and for informing at least one of the receiving node and the associated nodes about the match.

Optionally, the requested matching indication being associated with a list of a plurality of additional node addresses, the receiving node being configured for adding its address to the list and propagating the matching request with the addition to at least one the associated address.

Optionally, each the node is a mobile communication device.

Optionally, the matched nodes are configured for establishing a symmetric communication.

According to one aspect of the present invention there is provided node of a MAS. The node comprises a matching cache configured for storing a plurality of matching indications each associated with a potential MAS node and a communication receiver configured for receiving a matching request defining a requested matching indication associated with an address of a requesting MAS node. The node further comprises a matching module configured for identifying a match between the requesting MAS node and at least one of the potential MAS nodes by matching the requested matching indication and at least one of the plurality of matching indications, and a communication transmitter configured for informing at least one of the matched MAS nodes about the match.

Optionally, the informing comprises forwarding the matching request to at least one the matched MAS nodes.

Optionally, each the potential MAS node is a mobile terminal, the mobile terminal being a member of the group consisting of: a user terminal, a laptop, a cellular phone, a dual-mode phone, and a personal digital assistant (PDA).

Optionally, a member of the plurality of nodes is configured for dynamically changing its address.

Optionally, if the matching fails, the communication transmitter being configured for forwarding the matching request to at least one the associated potential MAS node.

Optionally, the matching indication defines a member of the group consisting at least one of: a readiness to participate in a communication session, a readiness to participate in a gaming session, a readiness to allocate a resource, and a readiness to use a resource.

Optionally, the matching indication define characteristic of the potential node, the characteristic define a member of the group consisting of: a geographic location, a skill rank, a type, a display type, a central processing unit (CPU) type, a display card type, and an operation system.

Optionally, each the stored matching indication is associated with a period time to live (TTL) indicator defining a period, the matching module configured for matching the request with the stored matching indication during the period.

More optionally, each the stored matching indication is associated with an iterations time to live (TTL) indicator defining a maximum value of forwarding, the communication transmitter configured for forwarding the matching request if it is not iterated for more than the maximum value.

Optionally, the node further comprises a matching request creating module for creating a new matching request, the communication transmitter being configured for propagating the new matching request around the MAS.

More optionally, the node further comprises an incentive generator module configured for limiting the creation.

According to one aspect of the present invention there is provided a method for matching at least two nodes of a MAS. The method comprises: a) storing a plurality of matching indications, each associated with an address of a potential node, in a first node the MAS, b) receiving at the first node a request defining a requested matching indication associated with a second node, c) identifying a match between at least one of the stored potential nodes and the second node by matching between the requested matching indication and the plurality of matching indications to, and d) informing at least one of the matched associated potential nodes and the second node about the match.

Optionally, the method further comprises establishing a connection between the second node and the matched potential nodes.

Optionally, the connection is a peer-to-peer (P2P) connection.

Optionally, the informing comprises forwarding the matching request to at least one of the matched potential nodes.

Optionally, one or more of the nodes of the MAS is a mobile communication terminal.

Optionally, the matching is not found, further comprising propagating the matching request to at least one of the associated addresses, the c) and d) being performed by the propagated nodes.

Optionally, the request defining a list of addresses of second nodes, further comprising adding an address of the first node to the list before the informing, the informing comprises propagating the request with the addition the associated addresses, the c) and d) being performed by the propagated nodes.

According to one aspect of the present invention there is provided a node matching method for a MAS. The method comprises: a) distributing first and second matching requests respectively from first and second nodes of the MAS to a plurality of third nodes of the MAS, the first and second matching requests having a common matching indication, b) locally caching the first matching indication and an identifier of the first MAS node in at least one of the plurality of third nodes, c) identifying a match by locally matching the matching indications at one of the plurality of third nodes, and d) informing at least one of the first and second nodes about the match.

Optionally, the distributing is performed by a search algorithm, the search algorithm being a member of the group consisting at least one of: a teeming algorithm and a flooding algorithm.

Optionally, the method further comprises establishing a connection between the first and second nodes, thereby allowing a plurality of remote users to participate in a common activity.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
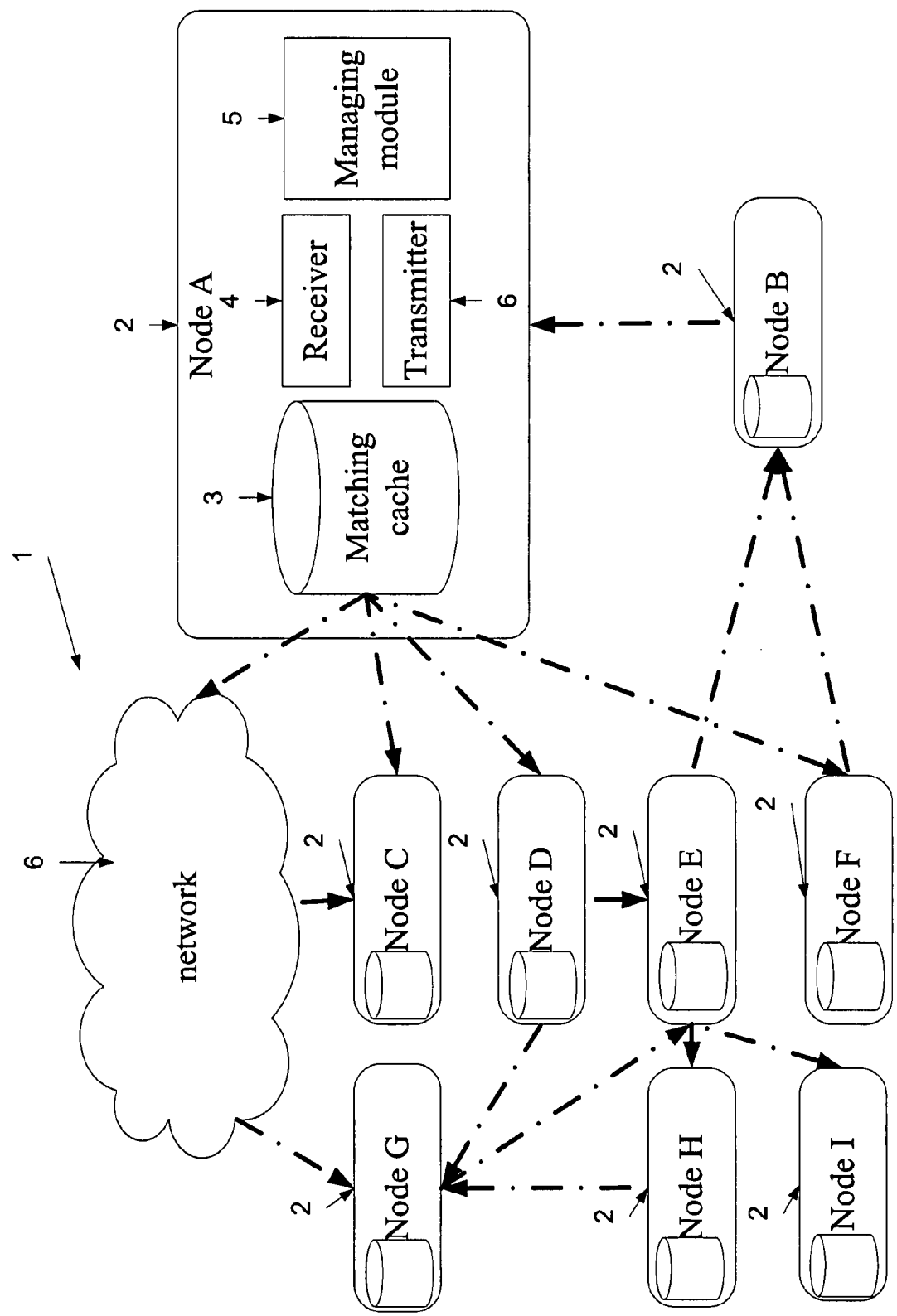
FIG. 1 is a schematic illustration of a multi-node system (MAS) that is composed of several nodes, according to one embodiment of the present invention.

The principles and operation of an apparatus and method according to some embodiments of the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

Reference is now made to FIG. 1, which is a schematic illustration of a multi agent network (MAN), such as a multi agent system (MAS) that is composed of several agents, which may be referred to as nodes 2, for example nodes A-G, according to one embodiment of the present invention. It should be noted that though the description of some of the embodiments of the present invention may refer to a certain MAS, any MAN may be used in these embodiments.

Optionally, the MAS 1 is an open MAS 1 wherein nodes 2 may enter, leave, reenter, and change their address. For example, the nodes 2 may be cellular phones or any other mobile communication terminals, which can be connected, disconnected, reconnected, and/or allocated with a new unique network address. Each one of the nodes 2 is a network node such as a server, a user terminal, a personal computer, a cellular phone, a dual-mode phone, a personal digital assistant (PDA) that is capable of wirelessly transferring information over cellular networks or any other system or facility that is capable of directly transferring information over wired and/or wireless networks.

Each one of the nodes 2, for example node A, is designed to establish a connection, such as a peer-to-peer (P2P) connection 7, with another node 2. The P2P connection is established over a wireless communication network, such a cellular network or a wireless computer network, such as wireless local area network (WLAN) that transmits and receives data that is optionally coded in packets using modulated electromagnetic waves.

One or more of the nodes 2 has a local cache 3, which may be referred to as a matching cache 3 that is used for storing a number of matching indications each defines one or more properties of a node that is a potential node for a match, such as readiness to participate in a certain activity, as described below. Each matching indication is associated with one or more source indicators, each of which defines an identity of a node that meets the associated matching indication definitions. Optionally, the matching cache 3 is designed for storing matching requests, which are received via the MAS 1. Such a matching request includes a matching indication and a source indicator. The source indicator is optionally an address of a node of the MAS 1. The matching cache 3 may be implemented by one or more memory devices, such as a nonvolatile memory (NVM) and/or dynamic random access memory (DRAM).

It should be noted that one or more of the nodes 2 may limit their participation in the matching process. For example, if the nodes are mobile communication terminals, a node, which is optionally a cellular phone, may be adjusted to limit its participation in the matching process when it has a limited battery life and/or a low computational and/or storage availability.

One or more of the nodes 2 has a receiver 4 that is designed to receive the matching requests, optionally from the nodes 2, which are connected to the MAS 1. A matching request defines a request for a match with a potential node, such as a node with readiness to take part in a multiplayer game or a communication session, for example a chat and/or a gaming session, a node with readiness to provide a resource, and a node with readiness to receive a resource. Optionally, the matching request includes a matching indication that defines one or more properties of the potential node and a source indicator that defines the identity of a node that is interested in the match, optionally the identity of the creator of the matching request. Such one or more properties may define the readiness of a user to participate in a gaming session, a resource that is defined as available, and/or a client that looks for a resource. Such a source indicator may include an internet protocol (IP) address, a subscriber identifier (ID), and/or an international telephone number.

Each node 2 has a matching module 5 that may use the information in the matching cache 3 for identifying potential nodes. In such a manner, one or more of the nodes may take part in the process of matching between two or more of the nodes 2 in the MAS 1. The matching module 5 matches between the received matching indication, which is defined in a received matching request, and one or more of the matching indications, which are stored in the matching cache 3.

The node 2 further includes a transmitter 6 for informing nodes of the MAS 1 about a node which may match matching indications they have posted, as described below. In such a manner, the node 2 may inform one or more nodes about other nodes which has been identified as matching for sharing a certain activity, such as a communication session. Furthermore, in such a manner, the node 2 may inform one or more nodes about another node that is suitable for allocating a resource, such as a file and/or a computational power, and/or for as receiving a resource that the informed node is ready to provide. The transmitter 6 may also be used for distributing a matching request that has been created by the node 2. For example, the node 2 may generate a matching request that includes a matching indication that defines one or more properties of a potential partner for an activity that is requested by the operator of the node 2 and a source indicator that defines the IP address of the node 2. Then, the node 2 may transmit the generated matching request to nodes, which are listed in its matching cache 3. In one embodiment of the present invention, the nodes 2 are communication terminals, optionally mobile, such as mobile phones. In such an embodiment, the creating node 2 may forward the matching request to its contact records. In such a manner, even if the matching cache 3 is empty or includes a limited number of addresses, the request is distributed to a sufficient number of nodes in order to find a match in a practical time.

The matching module 5 may also be used to analyze the received matching requests and determines whether the node 2 matches the matching indication, which is defined in the matching request, or not. It should be noted that a matching request may comprise a request for one or more addresses of one or more nodes and/or one or more resources, optionally as described below. Optionally, the matching request allows the transmitting node to find one or more nodes, optionally additional nodes, for a communication session, such as a gaming session, a chat session, a debate session, and/or parallel computing session. Optionally, the request allows a node to find one or more resources, such as files, for example audio and/or video files.

Optionally, a matching request is a bilateral matching request that is designed for matching between two nodes. Reference is now jointly made to FIG. 1 and to FIG. 2, which is a flowchart of a method for matching between at least two of the network nodes 2 of the MAS 1, according to one embodiment of the present invention. The method, which is exemplified using nodes A-G, may be implemented using any node in any MAS and is not limited to MAS 1 which is shown at FIG. 1.

Figure 2:
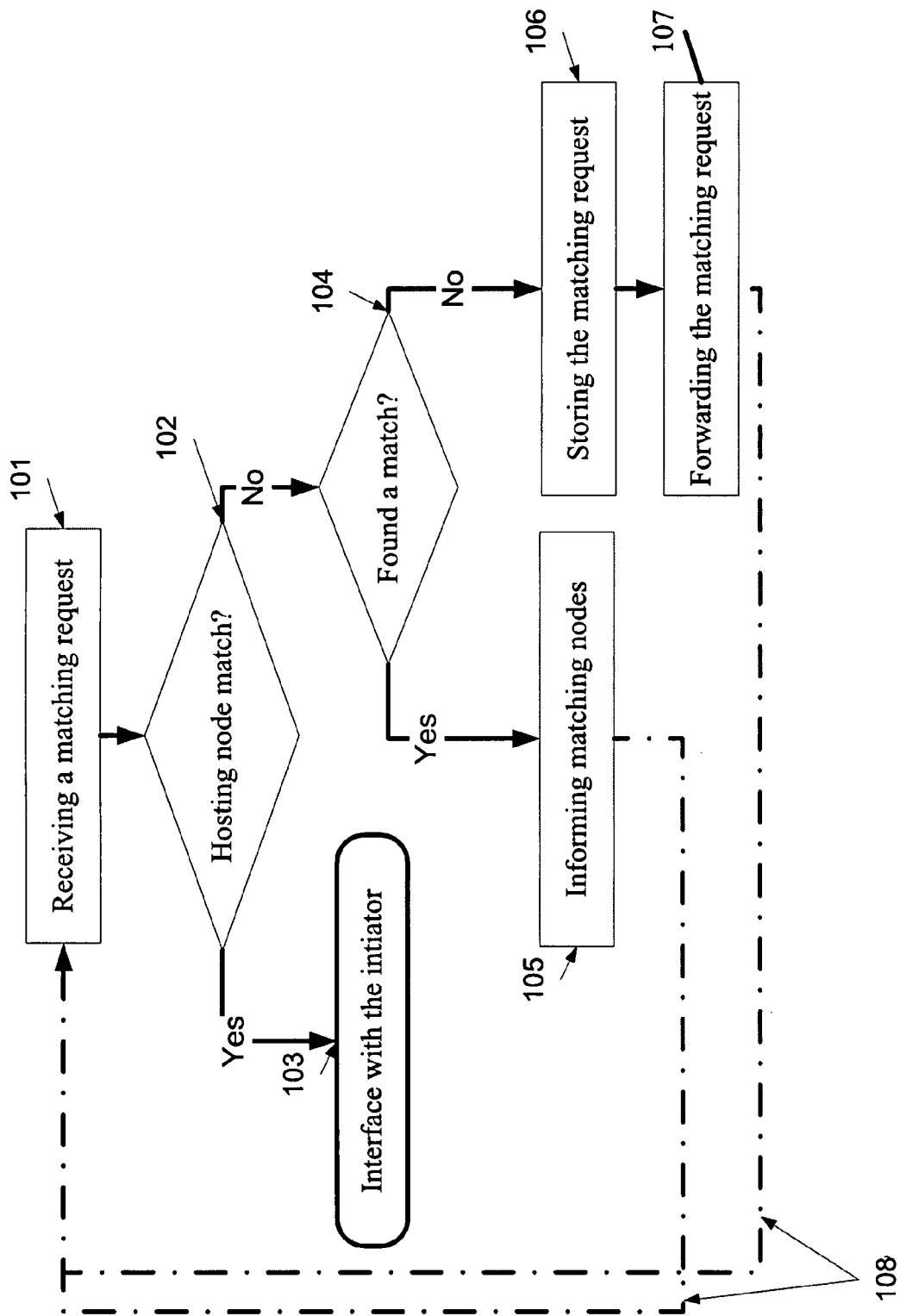
FIG. 2 is a flowchart of a method for matching between at least two of the network nodes of the MAS using a bilateral matching request, according to one embodiment of the present invention.

The matchmaking method, which is depicted in FIG. 2, may be used in a dynamic MAS wherein nodes may leave, reenter, and change their location. The matchmaking method is not based on a central server and therefore a malfunction of one of the nodes does not substantially degrade its performance. Furthermore, the method can be used for matching between two or more peers, as it does not limited to asymmetric matching between a fixed resource, such as a server and a fixed client, such as a user terminal. In such an embodiment, the match allows two nodes to establish symmetric communication, optionally wirelessly, between one another. For clarity, a symmetrical communication may be understood as a communication according to a protocol that allows the nodes to operate as a master unit or a slave unit and operate independently of any base station. Remote nodes may contact each other directly. A symmetric communication link is established between the two nodes and the nodes frequency-hop in synchronization; optionally in accordance with the federal communications commission (FCC) requirements, which are incorporated herein by reference. Optionally, the nodes independently monitor the signal strength of the incoming signal and can transmit power change commands to the other unit to increase or decrease transmission power as required.

As described above, each one of the nodes 2 is designed to receive a request to match two nodes, which may be referred to as a bilateral matching request, from another node in the MAS 1 or from a node and/or an agent that is external to the MAS 1. As shown at 101, a node 2 of the MAS 1, such as node A, receives bilateral matching request, for example from node B. Now, as shown at 102, node A analyzes the bilateral matching request and determines whether node A meets the one or more criteria in the matching indication of the bilateral matching request. Optionally, the managing module 5 reads the matching indication and checks whether node A meets the criteria, which are defined in the matching indication and set for a potential node, or not.

If node A meets the criteria, which are defined in the matching indication, as shown at 103, node A interfaces with the initiator, which is optionally node B, for example by providing it the requested resource and/or by joining a communication session, such as a gaming session. In one example, node B, which is optionally a mobile user terminal, such as a cellular phone, sends a bilateral matching request that comprises a request for establishing a peer-to-peer (P2P) gaming session, such as chess, backgammon, and draughts with node A that is optionally a mobile user terminal. The request includes a matching indication that defines the P2P gaming session and a source indicator that defines node B IP address. Node A receives the bilateral matching request and verifies whether the user thereof is interested in participating in such a gaming session or not. Such verification may be performed by popping up a notice to the user, allowing her to decide whether she is interested to join the gaming session instantly, substantially instantly, and/or later on. Such verification may be performed automatically by verifying whether the user of the node expressed interest in participating in such a gaming session. In such an example, after node A verifies the bilateral matching request, it establishes a connection with node B that allows the users of nodes A and B to participate in a common gaming session.

If node A is not a potential node and optionally does not meet the aforementioned criteria, matching potential nodes are looked for in matching requests, which are stored in the matching cache 3 of node A, as shown at 104 and described above. If one or more matching requests, which have been found in the matching cache 3, has a matching indication that matches the matching indication of the received bilateral matching request, node A informs the nodes which are specified in the matching requests about the received bilateral matching request, as shown at 105. However, if a match has not been found, the bilateral matching request is locally stored in the matching cache 3, as shown at 106, and the bilateral matching request is forwarded, as shown at 107, to all or a subset of the nodes which are listed in the matching cache 3.

As shown at 108, the method, which is depicted in 101-107, is repeated in each one of the nodes 2 of the MAS 1, until one or more matches are found or optionally until the forwarding depth reaches the forwarding depth that is defined in an interaction time-to-live (TTL) indicator, as described below. In particular, in one embodiment the matching request contains a counter field that is initialized according to the interaction TTL indicator value. Any intermediate node that receives the matching request first decrements the counter by 1. If the counter value is not zero, the receiving node proceeds as normal; otherwise, the receiving node does not contact the nodes, which are listed in the stored matching requests, and sends a negative response to the initiator. Optionally, such a bilateral matching request comprises one or more of the following:

1. A matching indication—as described above, the matching indication defines the properties of a node that is a potential match. Such properties may include a readiness to participate in multiplayer session, such as a session communication session, a readiness to allocate one or more resources, and/or a readiness to use one or more resources. Optionally, the matching indication functions as an indicator that defines which node and/or what is the state of a node that has a positive potential for matching. Optionally, the matching indication defines one or more criteria for the match, such as the location, the rank, the type of the node, and one or more properties of the node, for example the central processing unit (CPU), the display card, and/or the operation system of the node.

2. A source indicator—as described above, the nodes are designed to find a match between two or more other nodes and to inform the matched nodes about the match. The source indicator allows the matchmaking node to inform matching nodes about the match. The source indicator may also be used as an address that is forwarded with received matching requests, optionally as described below. Optionally, one or more of the nodes 2 host a list of addresses that defines one or more nodes to ignore and/or to use, for example to store in the matching cache. In such a manner, the node may improve the efficiency of the web by either ignoring problematic nodes or tracking only a group of predefined nodes of the MAS 1.

3. A termination indicator—an indicator that defines one or more criteria for eliminating the bilateral matching request before a match is found. The termination indicator indicates when the bilateral matching request should be ignored. The criteria may define a termination period, a time to live, a number of cycles, the size of the space in said local cache, a number of matches made, and a time of day. In one embodiment, a termination indicator that defines a termination period, which may be referred to as a period time-to-live (TTL) indicator, is used. As described above, the bilateral matching request may be a matching request for a communication session and/or allocation to one or more resources. Such a request may be relevant only for a limited period. For example, a node that creates and distributes a matching request, which may be referred to as a matchmaking process initiator, may create and send the matching request in order to find one or more nodes for a gaming session. In order to avoid a scenario wherein the request of the matchmaking process initiator is pending for a period that is longer than the period that she is willing to wait, the period TTL indicator defines the maximum availability period of the matchmaking process initiator. After the defined period has elapsed, the hosting nodes are instructed to ignore it during the matching process that is described below.

In one embodiment, a termination indicator that defines an interactions indicator is used. The interactions indicator defines the maximum depth of the forwarding that is the maximum number of times the matching request is transferred from one node to another. Such an indicator may be used for moderating the traffic that is caused by the matching process. After the number of interactions, which are defined in a certain matching request, has been exceeded, the nodes are instructed to ignore it and it is optionally not forwarded, as described below.

Optionally, the matching request further includes a list and/or a table that defines a number of possible matches, each with a different score. In such an embodiment, matches with scores, which are lower than the score of the match with the highest score, may be found and stored during the matching process. The stored match with the highest score is realized, optionally in a similar manner to 105, only when the period and/or the interaction indicators indicate that the matching process has finished.

Optionally, the forwarding 107 is performed by sending a copy of the bilateral matching request to all or a subset of the nodes, which are listed in the stored matching requests, which in turn propagate the bilateral matching request to all or to a subset of the nodes, which are listed in their matching request repositories, and so on and so forth.

Optionally, the forwarding 107 is performed according to a predefined search algorithm. Optionally, the predefined search algorithm is a flooding algorithm. In such an embodiment, when a node, such as node B, sends a bilateral matching request to another node, such as node A. Node A checks its matching cache, and if a matching bilateral matching request is not found there, it contacts all the nodes in the matching cache. In turn, the nodes in the matching cache check their matching request repositories and if a matching bilateral matching request is not found there, they propagate the search message to all the nodes, which are listed in their matching request repositories. The procedure ends either when a match is found or when the forwarding depth is reached. A detailed description about such a flooding algorithm is provided in V. V. Dimakopoulos and E. Pitoura, on the performance of coding-based resource discovery, *IEEE Trans. Parallel Distrib. Syst.*, 17(11):1242.1252, 2006, which is incorporated herein by reference.

Optionally, the predefined search algorithm is a variation of the flooding algorithm that is designed to reduce the number of matching requests, which are sent over the MAS 1. Such a variation may be a teeming algorithm, for example as described in V. V. Dimakopoulos and E. Pitoura, "*Performance Analysis of Distributed Search in Open Agent Systems,*" Proc. Int'l Parallel and Distributed Processing Symp. (*IPDPS* '03), 2003, which is incorporated herein by reference, a probabilistic flooding, for example as described in F. Banaei-Kashani and C. Shahabi, "*Criticality-Based Analysis and Design of Unstructured Peer-to-Peer Networks as Complex Systems,*" Proc. GP2PC '03, Third Int'l Workshop Global and Peer-to-Peer Computing, 2003, which is incorporated herein by reference, and/or according a random Breadth-first search (BFS), for example as described in V. Kalogeraki, D. Gunopulos, and D. Zeinalipour-Yazti, "*A Local Search Mechanism for Peer-to-Peer Networks,*" Proc. 11*th ACM. Conf. Information and Knowledge Management* (*CIKM*), 2002, which is incorporated herein by reference.

For example, if a teeming algorithm is used at one or more of the nodes and a match to a certain matching request is not found at the respective matching cache, the node propagates the matching request only to a random subset of the nodes which are listed in the matching cache.

It should be noted that in the present invention, more than one of the nodes may initiate the forwarding process simultaneously or substantially simultaneously. In such a manner, the search is performed, simultaneously or substantially simultaneously, in more than one direction. Such a search may reduce the matching time as more than one matching requests may be propagated simultaneously or substantially simultaneously toward one another.

Optionally, the forwarding 107 is performed according to changing values, such as the size of the MAS 1, the average size of a local cache of a node, etc.

Figure 3:
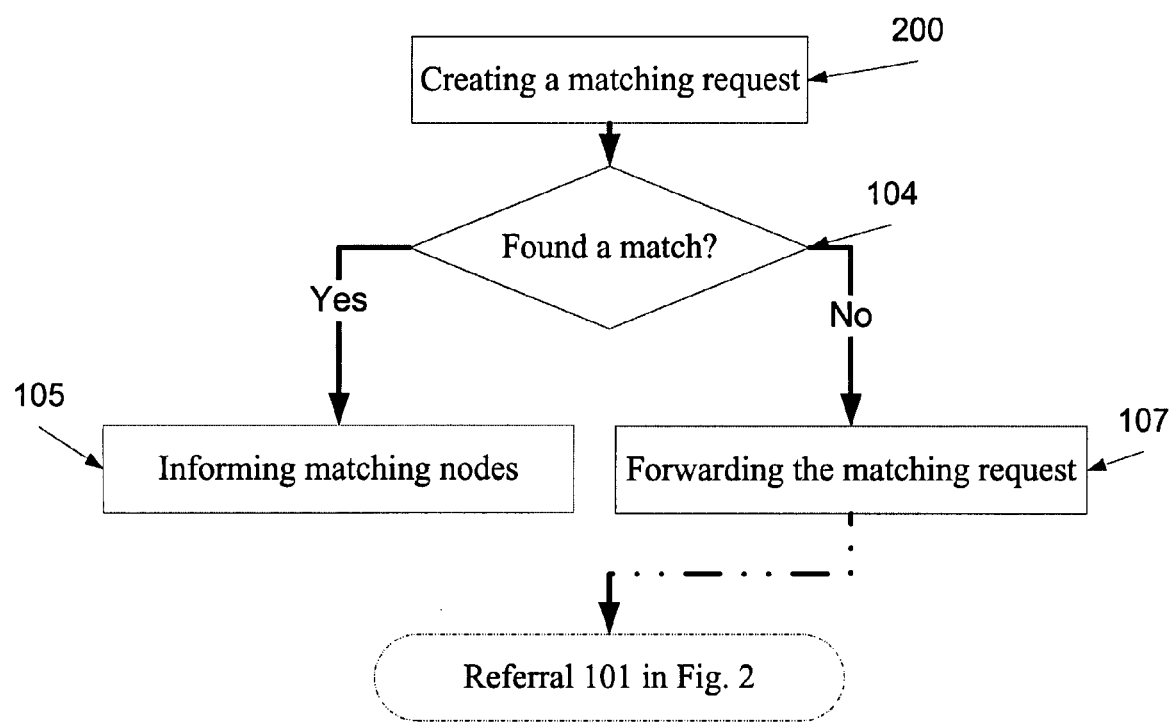
FIG. 3 is a flowchart of a method for matching between at least two of nodes, optionally mobile nodes, according to one embodiment of the present invention.

Reference is now made to FIG. 1 and to FIG. 3, which is a flowchart of a method for matching between at least two of nodes, optionally mobile nodes, according to one embodiment of the present invention. When a node 2, such as node A, receives instructions to acquire resources and/or to establish a communication session, such as a gaming session, with another node, it creates a bilateral matching request, as shown at 200. Optionally, the node is a cellular phone and the instructions are for initiating a gaming session, such as chess, monopoly, and backgammon, with one or more users, which are connected to one or more of the node 2 in the MAS 1.

Then, as shown at 104 and described above, a match is looked for in the matching cache 3 of the creating node. If one or more matching requests that match the bilateral matching request have been found among the matching requests, which are stored in the matching cache 3, the creating node optionally informs the initiators of the matching requests about the received bilateral matching request, as shown at 105. However, if a match has not been found among the locally stored matching requests, the bilateral matching request is forwarded, as shown at 107, to nodes, which are listed in the matching cache 3, as described above. Optionally, as described above, the nodes 2 uses the addresses in the book address to support the forwarding, which is depicted in 107.

Optionally, each one of the nodes that receives a copy of the bilateral matching request follows 101-107 of FIG. 2, as described above, until the requested resources are provided, the requested communication session is established, and/or until the forwarding depth reaches the forwarding depth that is defined in the interaction indicator, optionally as described above.

Figure 4:
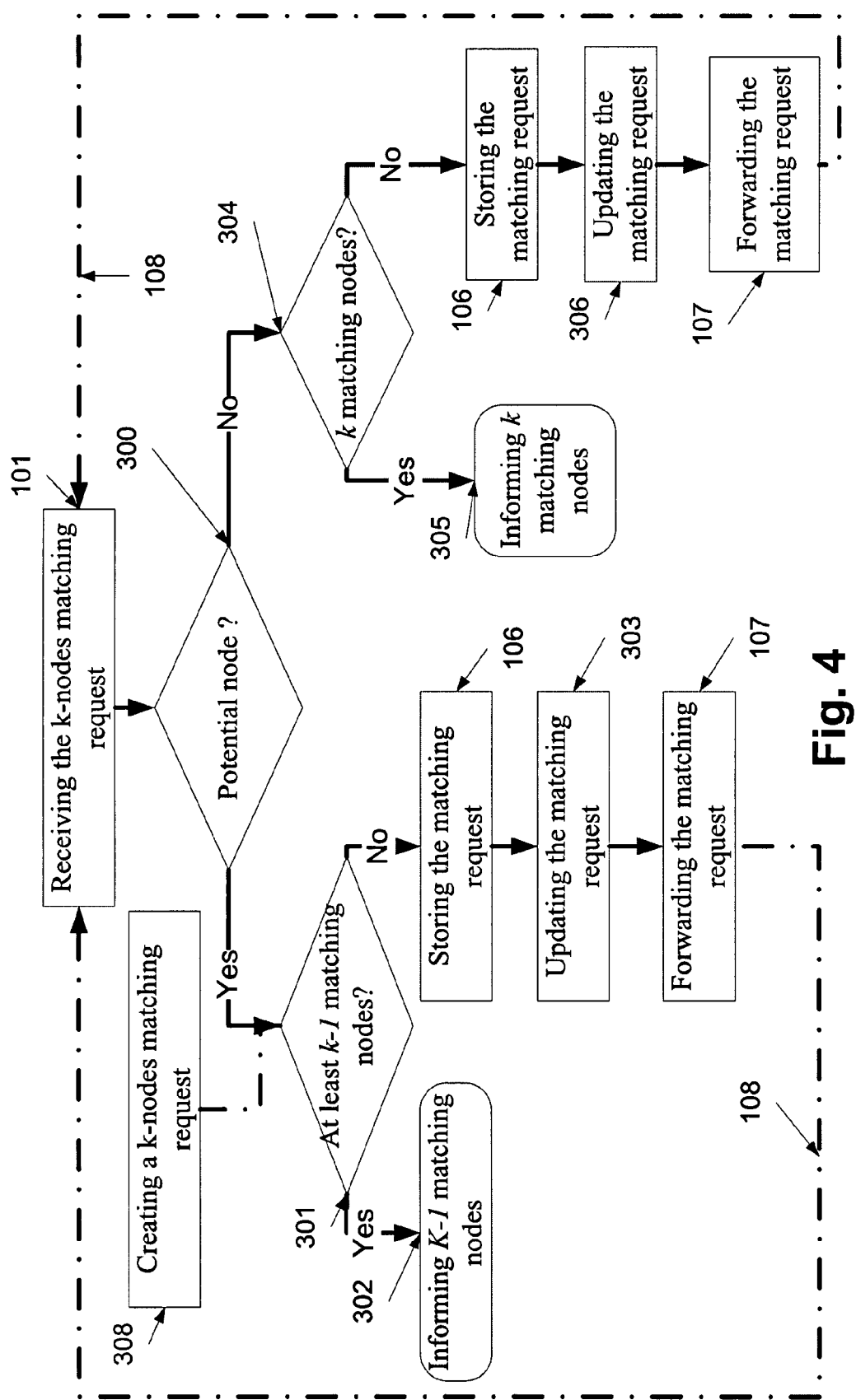
FIG. 4 is a flowchart of a method for matching between more than two nodes using a multi-node matching request, according to one embodiment of the present invention.

Reference is now jointly made to FIG. 1 and to FIG. 4, which is a flowchart of a method for matching between more than two nodes, optionally mobile nodes, according to one embodiment of the present invention. The method, which is exemplified using nodes A-G, may be implemented using any node in any MAS 1 and is not limited to the MAS 1 which is shown at FIG. 1.

The method, which is depicted in FIG. 4, may be used for establishing multi-node sessions, optionally symmetric, which may be referred to as k-node session, where k denotes the number of nodes in the session or the minimum number of nodes in the session. The k-node session may be established to allow a multi-node activity and/or for allowing one or more nodes to access simultaneously one or more resources where the total number of resources and accessing nodes is more than two. For example, if the user of node B wants to participate in a multi-node gaming session, such as bridge, a multi-node session that connects four players has to be established. In order to establish such a multi-node session, one of the nodes 2 creates a complex matching request, which may be referred to as a multi-node matching request, that is forwarded to all or a subset of the nodes, which are listed in its matching cache. Unlike the bilateral matching request that is described above, the multi-node matching request is updated during the forwarding process, as further described below. Briefly stated, unlike the bilateral matching request, a k-nodes matching request that contains a potential nodes list is forwarded among the nodes 2 of the MAS 1 as long as k matching nodes are not found. During the forwarding, the potential nodes list is updated with the addresses of the nodes that match the matching request's requirements, as described below. In such a manner, a single multi-node matching request is used for informing nodes about up to k-1 matching nodes.

The multi-node bilateral matching request optionally comprises the following information:

1. A number of nodes indicator—a value that defines the total or minimum number of participates which are needed to be matched before the requested session begin. Optionally, the number of nodes indicator defines a minimum number of nodes.

2. A potential nodes list—a list that contains the addresses of all the nodes that have been identified as matching nodes.

3. A termination indicator list—a list that contains the termination indicators of each one of the members of the k-potential nodes list. Each termination indicator is optionally defined as described above.

4. A matching indication—as described above, the matching request comprises a request for a match a number of nodes for a k-node session. Optionally, the activity type functions as an indicator that defines which activity is requested by the initiator that sent the matching request.

As depicted in FIG. 4, when one of the nodes 2 of the MAS 1, such as node A, receives a multi-node matching request, as shown at 101 and described above, it verifies, as shown at 300, whether it is a potential node to according to the matching indication. As shown at 301, if the receiving node is a potential node, it checks whether the potential nodes list of the received multi-node matching request and its local matching cache 3 has at least k-1 matching requests together. Optionally, a listed matching request is considered as a matching request only during the period that is defined in the termination indicator, which is defined as a period TTL indicator, as described above. If the local matching cache lists at least k-1 matching requests, as shown at 302, the receiving node contacts all or a subset of the nodes, which are listed in the at least k-1 matching requests, and informs them that enough potential nodes have been identified in order to initiate the requested communication session. If the local matching cache lists less than k-1 matching requests, as shown at 303, the multi-node matching request is stored in the local matching cache 3, as shown at 106, and its potential nodes list is updated with the address of the receiving node, as shown at 303. Then, as shown at 107, the updated multi-node matching request is forwarded to all or a subset of the less than k-1 nodes which are listed in the local matching cache 3. The multi-node matching request is forwarded using a search algorithm such as flooding and teeming algorithms, as described above, in relation to the forwarding of the bilateral matching request. As shown at 108, the process, which is depicted in FIG. 4, is repeated in each one of the nodes 2 of the MAS 1, until k-1 nodes are found or until the forwarding depth exceeds the forwarding depth that is defined in the interaction indicator optionally, as described above.

If the receiving node is not a potential node, as shown at 304, the receiving node checks whether the potential nodes list of the received multi-node matching request and its local matching cache 3 list together k matching requests, as shown at 304. If they list together k matching requests, as shown at 305, the receiving node contacts all or a subset of the nodes, which are listed in the k matching requests, and informs them that enough potential nodes have been identified in order to initiate the requested communication session. If the local matching cache lists less than k matching requests, as shown at 106, the multi-node matching request is stored, updated with the nodes in the matching requests, as shown at 306, and forwarded to all or a subset of the less than k nodes which are listed in the local matching cache 3, as shown at 107. The multi-node matching request is forwarded using a search algorithm such as flooding and teeming algorithms, as described above in relation to the forwarding of the bilateral matching request. As shown at 108, the process, which is depicted in FIG. 4, is repeated in each one of the nodes 2 of the MAS 1, until k nodes are found or until the forwarding depth exceeds the forwarding depth that is defined in an interaction indicator, optionally as described above.

If one of the nodes 2 of the MAS 1, such as node B, is the creator of the multi-node matching request, as shown at 308, it verifies whether the local matching cache 3 has k-1 matching requests, as shown at 301, and proceeds according to 302 or 106, as described above. It should be noted that when such a complex matching request is received, it may be decomposed into simple matching requests, before being stored in the cache, for each participate that already has been found and documented in the aforementioned potential nodes list. In such an embodiment, the structure of the cache remains the same and allows a timeout mechanism to analyze separately each one of the termination indicators and to ignore expired or invalid matching requests according to their termination indicators, as described above.

Optionally, each one of the nodes comprises an incentive generator module (not shown) that is designed to monitor the activity of the node 2 in matchmaking processes, as described above. In other to allow one of the nodes 2 to assist in matching between other nodes 2 of the MAS 1, it has to invest resources such as computational and storage resources. The incentive generator module In order to encourage the operator of the node 2 to allocate the required resources, the incentive generator module controls the access of the node to other nodes. Optionally, the incentive generator module counts how many matching requests have been stored in the matching cache 3 and uses the count as a measurement in the decision whether to allow the related node to create matching request or not. Other modules, which are based on the pricing of using the matching process, may also be used.

It is expected that during the life of this patent many relevant devices and systems will be developed and the scope of the terms herein, particularly of the terms a network, a node, a client, a repository, and cache is intended to include all such new technologies a priori.

Additional objects, advantages, and novel features of some embodiments of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

In the following section, three experiments are documented. Each experiment provides information, which may be useful for understanding and the advantages of the methods and the systems of the present application. The first experiment includes examples A-C that examines the effects of different network characteristics, such as a connectivity level, a TTL level, and a teeming probability, on the performance measures. The second experiment includes example D that focuses on the use of the aforementioned matching cache or cache for a given set of parameters or for the matching performance, in the context of bilateral matchmaking. Finally, the third experiment, example E, compares between bilateral matching and multilateral matching.

It should be noted that in examples A-E and on the related figures, the nodes may be referred to as participants and matching requests may be referred to as messages. Furthermore, it should be noted that in examples A-E, the matching performance value is evaluated by three independent measures:

I. Matching success rate—the percentage of matching attempts that has ended in a successful match. The higher is the value the higher is the matching performance value.

II. Number of matching requests—the number of matching requests which were sent between any couple of nodes during a single matchmaking process. The lower is the value the higher is the matching performance value.

III. Matchmaking Time—the time it takes a node to establish a communication session or to access a requested resource, in units of network hops. The shorter is the time the higher is the matching performance value. It should be noted that in examples A-C the matchmaking time is calculated for successful matches.

As described above, in examples below the effects of different network characteristics on matching performance are probed. The examples are based on a MAS that is modeled as a directed graph wherein vertexes represent network nodes with address books, such as cellular phones, and edges in the graph correspond to entries in the node's address book. In order to evaluate the aforementioned search algorithms, different graphs that correspond with different networks have been generated using the following procedure:

First, a complete simple cycle, encompassing all the nodes in the network, which may be referred to as N nodes, has been created, optionally by establishing an N-size ring topology, in a manner that ensures that the graph is connected. Then, an edge with probability p is created between any two nodes of the MAS. In this examples N=1000, p has variable values between zero and one, and ten different matching indications are propagated using the matching requests.

In addition, a system with a number of different workloads is simulated by creating two scenarios. In the first scenario, 100 nodes are randomly defined as active. In the second scenario, 500 nodes are randomly defined as active. Active nodes are defined as nodes, which are ready to participate in a communication session, such as a gaming session, or as nodes that may provide access to their resources or ready to receive resource from other nodes. Optionally, each one of the 100 or 500 active nodes in sequentially activated.

In examples A-C, nine graphs and three scenarios are randomly generated. Each scenario is separately simulated on each graph and therefore 27 samples are formed for each simulation.

Optionally, the value of the teeming probability, which is between 0 and 1, as defined in V. V. Dimakopoulos and E. Pitoura, On the performance of coding-based resource discovery, *IEEE Trans. Parallel Distrib. Syst.*, 17(11):1242.1252, 2006, which is incorporated herein by reference, is varied. When the teeming probability is 1, the matching request is send to all the entries in node's address book and to all the nodes which are listed in matching requests in the repository. However, if the teeming probability is zero, no matching request is forwarded.

EXAMPLE A

In example A, the effect of the graph connectivity on the matching performance is evaluated. The graph connectivity is estimated by varying p.

In the example, p is set to be 0.0001, 0.001, and 0.005. Higher values induce graphs which are more strongly connected.

Figure 5:
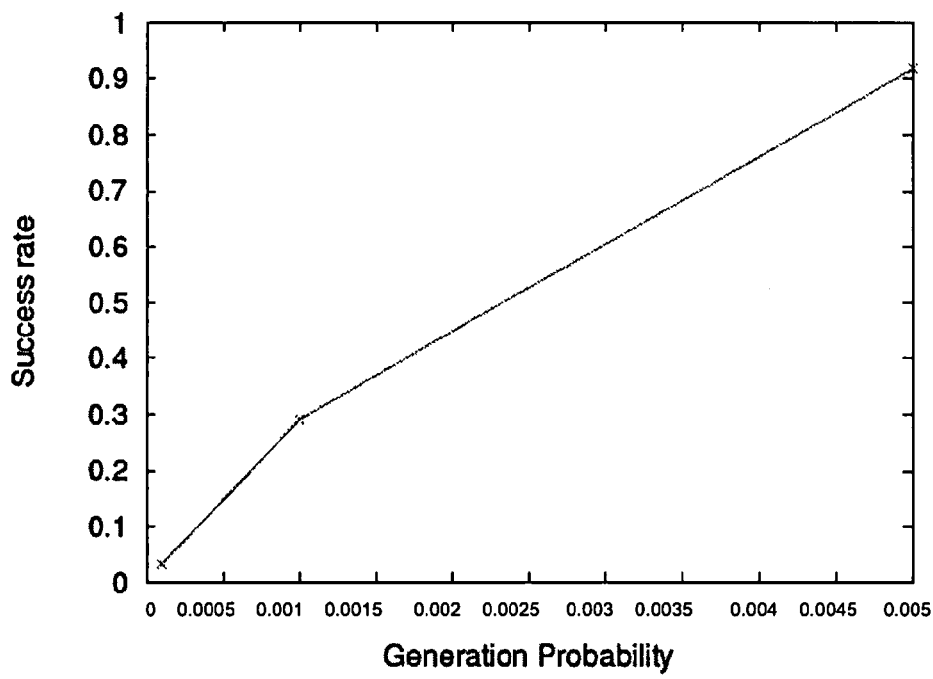
FIG. 5 is a graph depicting the success rate as a function of the graph connectivity.
Figure 6:
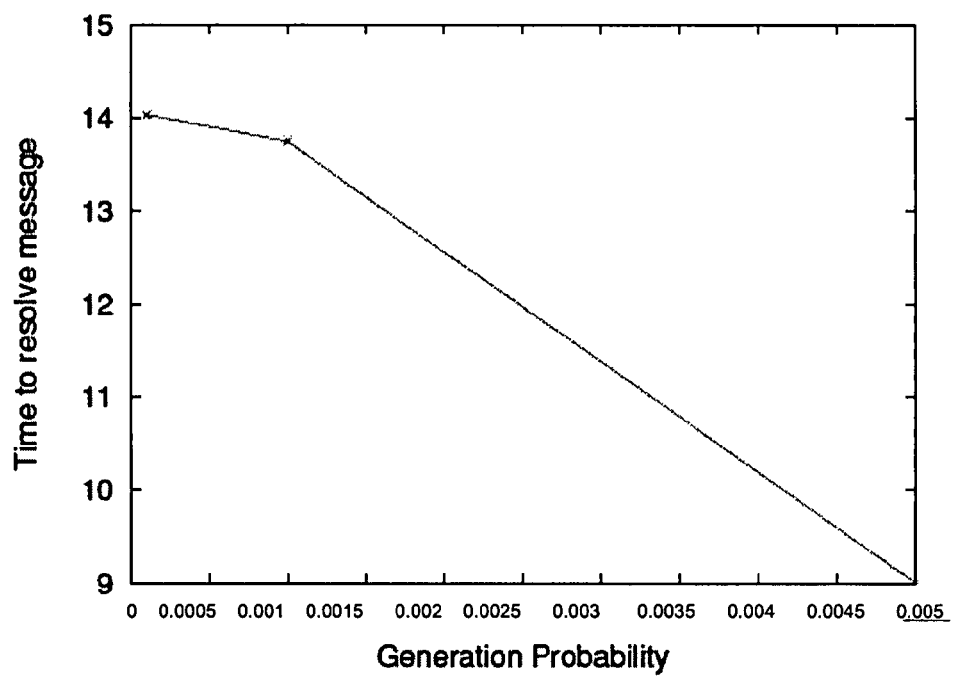
FIG. 6 is a graph depicting the time for matchmaking as a function of graph connectivity.
Figure 7:
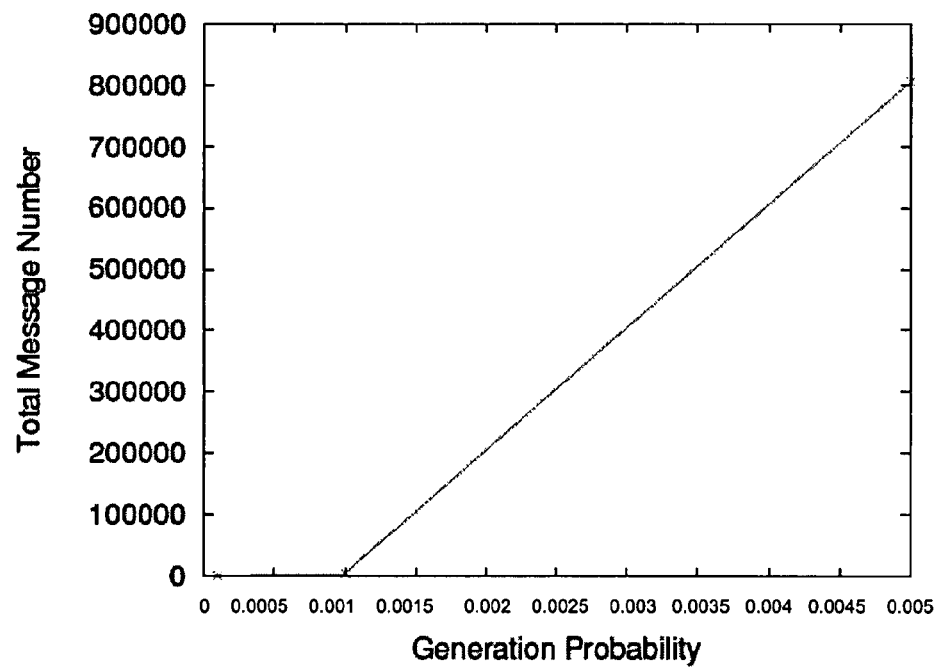
FIG. 7 is a graph depicting the number of matching requests as a function of graph connectivity.

FIGS. 5, 6, and 7 respectively depict a matchmaking success rate, a matching time for successful matches, and a total number of matching requests, as a function of the connectivity that is measured according top. The teeming probability is set to 0.5, the local cache is set to 0, 500 nodes are marked as active, and the TTL indicators are set to 5.

As respectively depicted in FIGS. 5, 6, and 7 the success rate increases dramatically as the graph connectivity increases, the time for finding a match is reduced, and the number of matching requests rapidly increases.

EXAMPLE B

In example B, the effect of the TTL value on matching performance is evaluated. The TTL is controlled directly, and assumed uniform for all copies of a certain matching request. The TTL level is set at 5, 10, and 20. The high values indicate that matching requests traverse the graph for longer periods and increase the number of matching requests, hopefully with a chance of a successful match.

Figure 8:
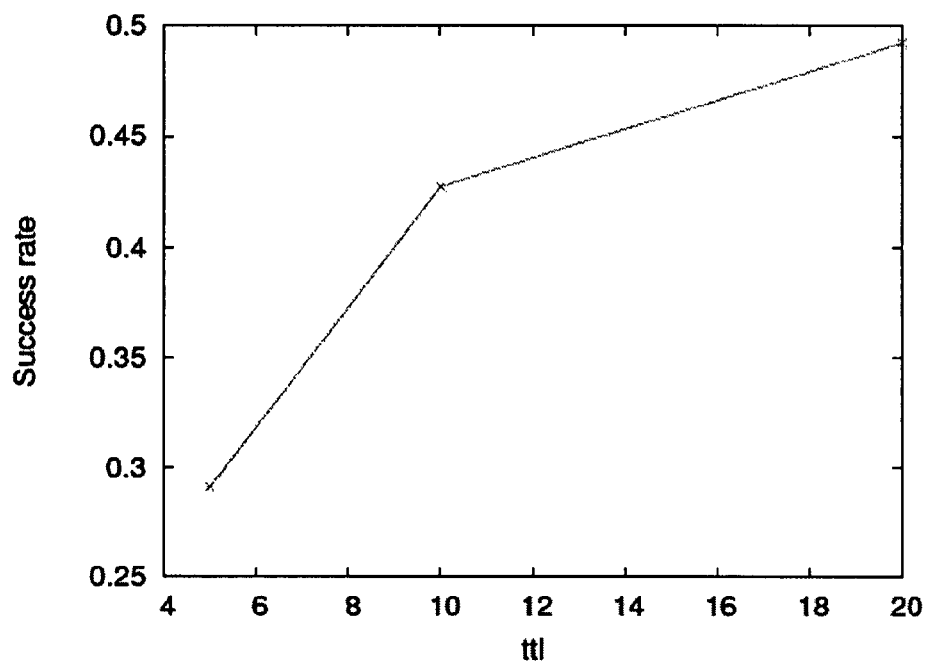
FIG. 8 is a graph depicting the success rate as a function of time-to-live (TTL) value.
Figure 9:
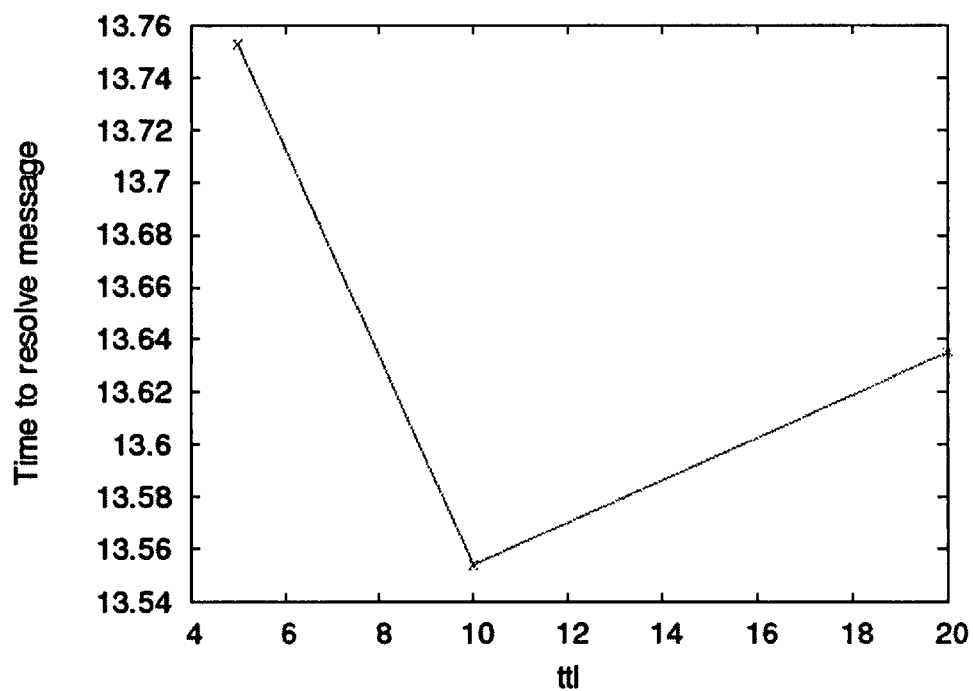
FIG. 9 is a graph depicting the time for matchmaking as a function of TTL.
Figure 10:
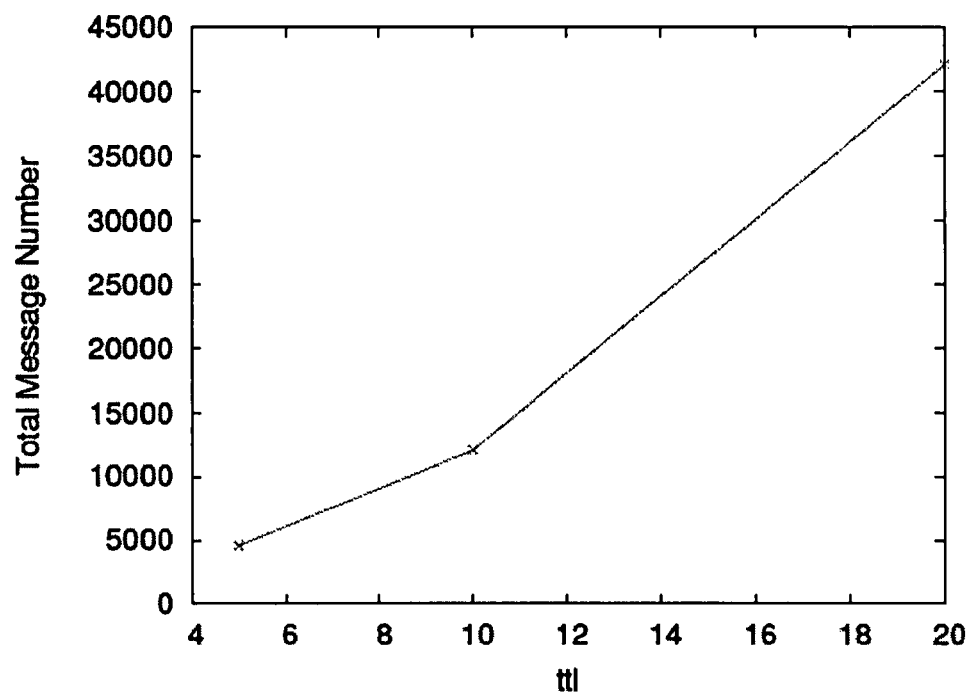
FIG. 10 is a graph depicting the number of messages as a function of TTL.

FIGS. 8, 9, and 10 respectively show the matchmaking success rate, the matching time for successful matches, and the total number of matching request copies, as a function of the TTL value. In the depicted example, the teeming probability is 0.5, the node's cache is set to 0, 500 nodes are defined as active, and p=0.005. As depicted in FIGS. 8, 9, and 10, as the TTL increases, the success rate and the number of matching requests increases and the time for finding a match appears to change in a nonmonotonic manner. However, it can be noted that the range on the y-axis is approximately 0.22 and therefore it may be assumed that the time to resolve a matching request is not effected by the TTL values.

EXAMPLE C

In example C, the effect of the teeming probability on the matchmaking Performance is probed. In this example, t denotes a directly controlled teeming probability and assumed to be uniform for all agents.

In the example, t is set to be 0.001, 0.1, and 0.5. The higher is the value, more matching requests are forwarded by one or more of the nodes, and the network traffic increases. Such an increase expectedly leads to higher success rate.

Figure 11:
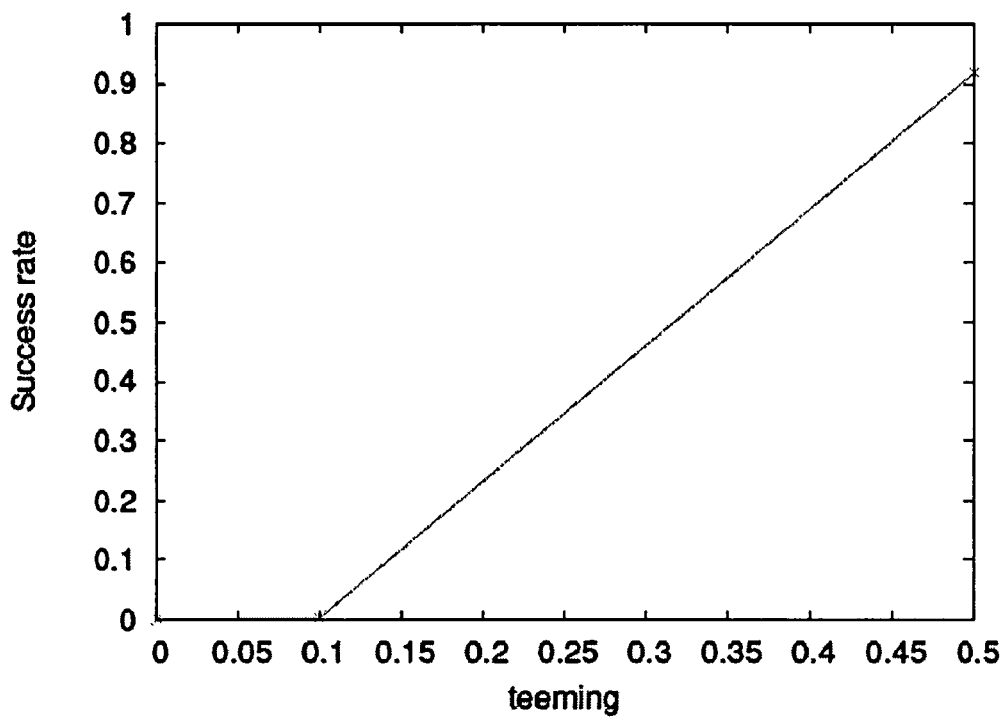
FIG. 11 is a graph depicting the success rate as a function of teeming probability.
Figure 12:
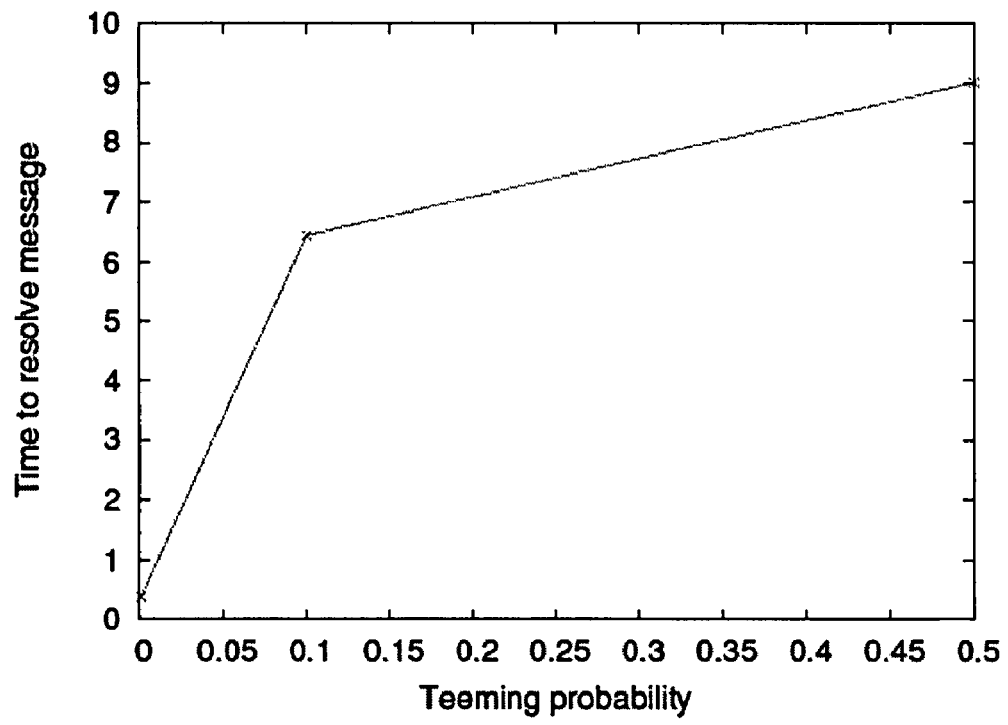
FIG. 12 is a graph depicting the time for matchmaking as a function of teeming probability.
Figure 13:
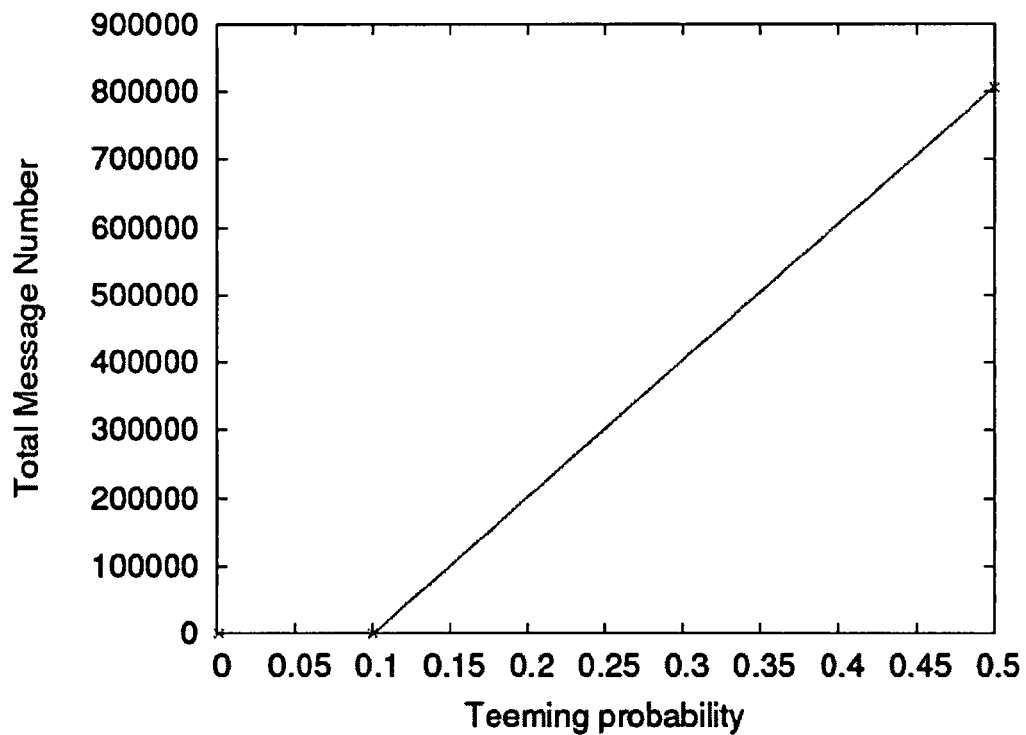
FIG. 13 is a graph depicting the number of messages as a function of teeming probability.

FIGS. 11, 12, and 13 respectively depict the matchmaking success rate, the matching time for successful matches, and the number of matching requests, as a function of the teeming value. In example B, the TTL value is 5, the cache is set to 0, the number of active nodes is set to 500, and p=0.005.

FIGS. 11, 12, and 13 respectively shows that as teeming increases, the success rate, the number of messages, and the time for finding a match increases.

EXAMPLE D

As described above, in example D, the effect of the matching cache size on the matching performance is evaluated. In this example, the matching cache size is set to 0, 1, 5 and 10.

Figure 14:
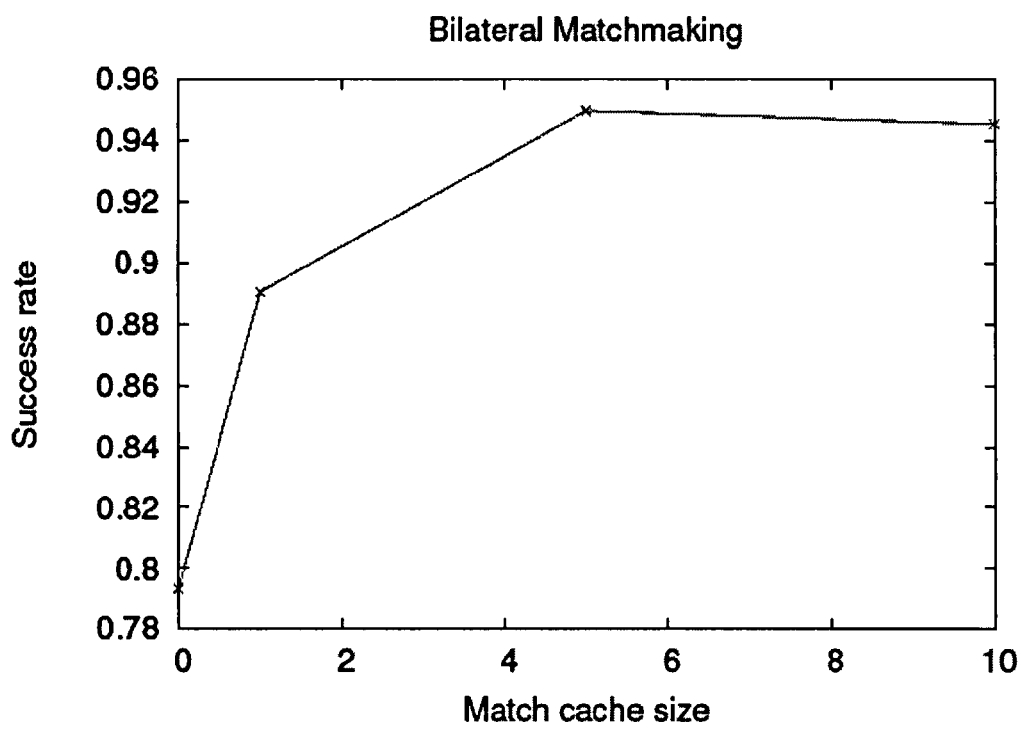
FIG. 14 is a graph depicting the success rate as a function of matching cache.
Figure 15:
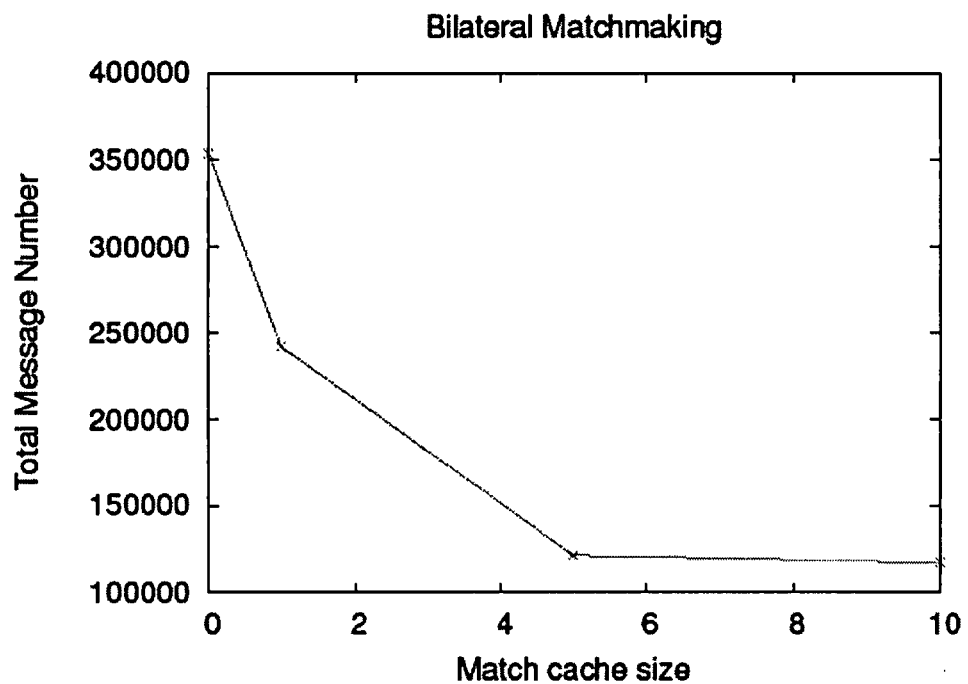
FIG. 15 is a graph depicting the time for matchmaking as a function of matching cache size.
Figure 16:
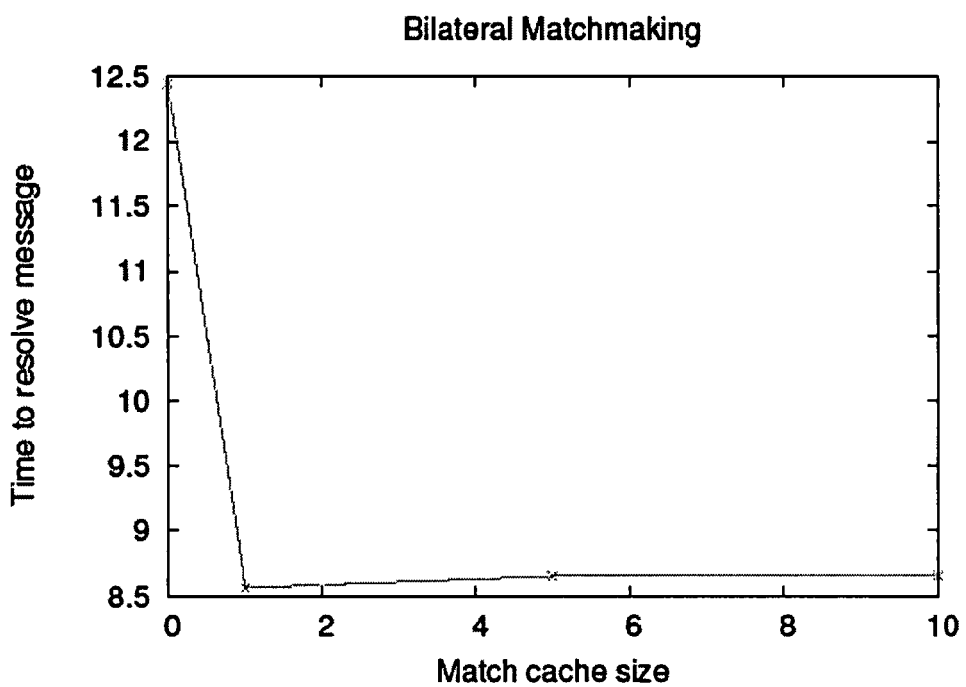
FIG. 16 is a graph depicting the number of messages as a function of matching cache size.

FIGS. 14, 15, and 16 respectively depict the matchmaking success rate, the matching time for successful matches, and the number of matching requests as a function of the matching cache size. In this example N=1200, TTL=5, the cache is 0, 600 nodes are marked as active, p=0.005, and the teeming probability is 0.3.

A respectively depicted in Figs. k, l, and m, as the matching cache size increases, the success rate increases, the number of matching requests decreases, and the time for finding a match decreases. It should be noted that even a relatively limited matching cache, for example a cache that can host only one matching request, is sufficient to provide a sharp improvement in the matching time.

In addition, the size of the cache has a direct influence on the total number of matching requests that travels over the MAS. The larger is the cache, less matching requests travels over the MAS.

In the following example, results for a cache of size 0 are provided. The example provides an upper bound on the best performance of the aforementioned unilateral search. In this example the cache of each node does not allow storing matching requests and the advantage of active matchmaking that includes actively storing and using matching requests by each one of the nodes of the MAS is reduced.

A match between nodes in the MAS is considered successful if one of the nodes founds the other. In order to allow a standard unidirectional algorithm or a bidirectional algorithm with matching cache size to achieve such a match, a matching request from one of the nodes has to reach the other and the same number of matching requests has to be sent. Thus, a bidirectional algorithm with matching cache size of zero is at least as good as a standard unidirectional algorithm.

EXAMPLE E

Figure 17:
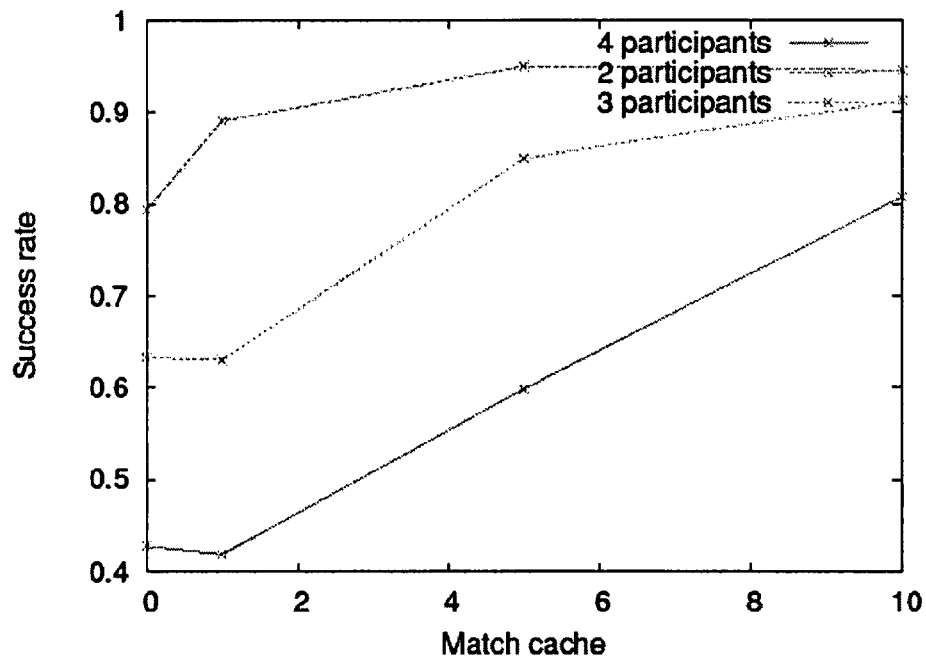
FIG. 17 is a graph depicting the success rate as a function of matching cache size, for different numbers of nodes.
Figure 18:
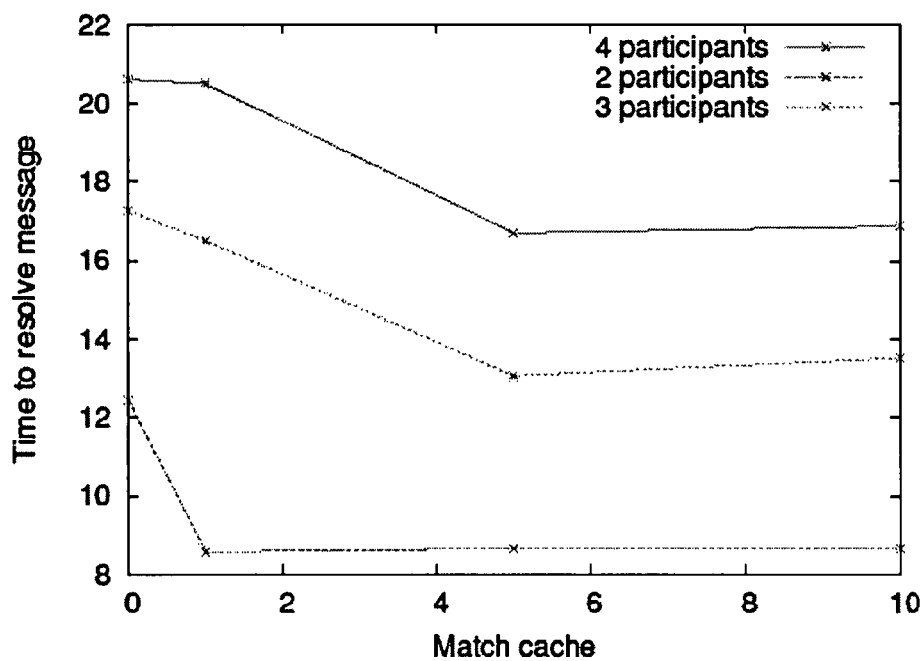
FIG. 18 is a graph depicting the time for matchmaking as a function of matching cache size, for different numbers of nodes.
Figure 19:
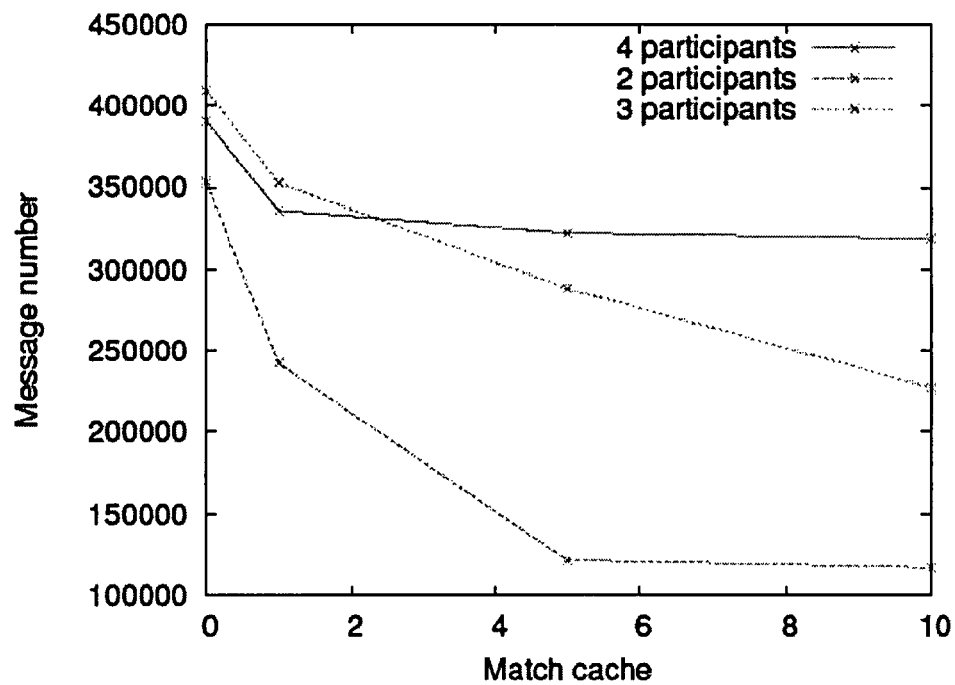
FIG. 19 is a graph depicting the number of messages as a function of matching cache size, for different numbers of nodes.

As described above, in example E, the use of the extended algorithms in k-node matching is probed. FIGS. 17, 18, and 19 respectively depict the matchmaking success rate, the matching time for successful matches, and the number of sent matching requests, as a function of t that denotes the teeming probability value. In this example, N=1200, TTL=5, the visitor's cache is set to 0, 600 agents are defined as active, p=0.005, and the t=0.3.

As depicted in FIGS. 17, 18, and 19, the effect of caching the bilateral matching request is reduced as the number of nodes increases from 2 to 4. As more nodes are sought in a bilateral matching request, the caching of matching requests has less effect on the matchmaking time and on the number of sent matching requests. Briefly stated, as the number of nodes which are sought in a bilateral matching request increases, the matchmaking algorithm tends to yield the same outcomes as a unidirectional algorithm.

Figure 20:
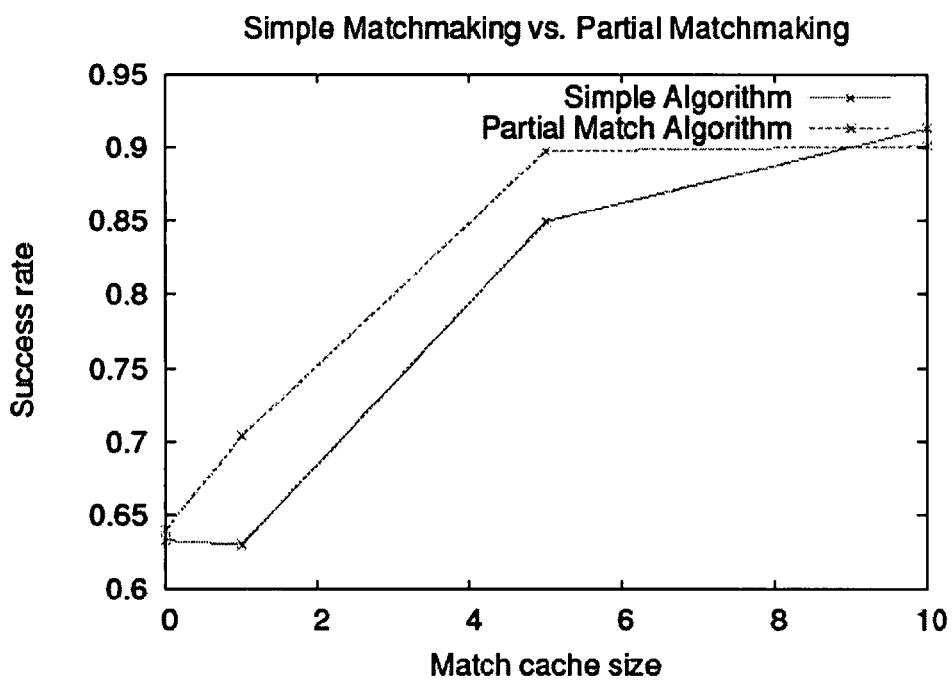
FIG. 20 is a graph depicting the success rate as a function of matching cache size, depicting the effect of using simple and complex matching requests.
Figure 21:
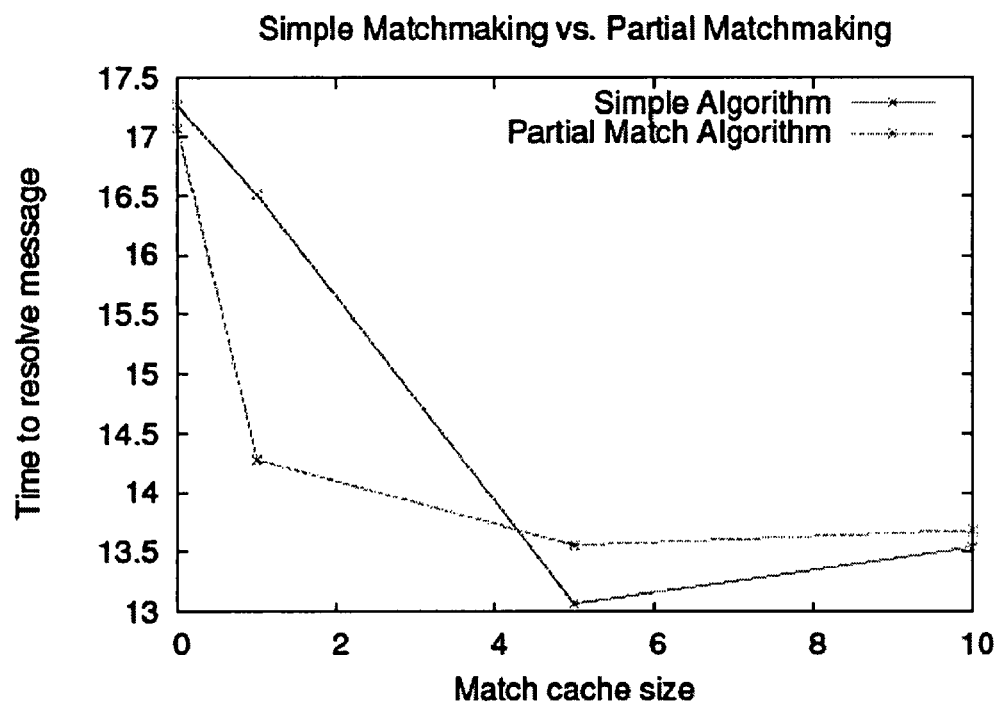
FIG. 21 is a graph depicting the time for matchmaking as a function of matching cache size, depicting the effect of using simple and complex matching requests.
Figure 22:
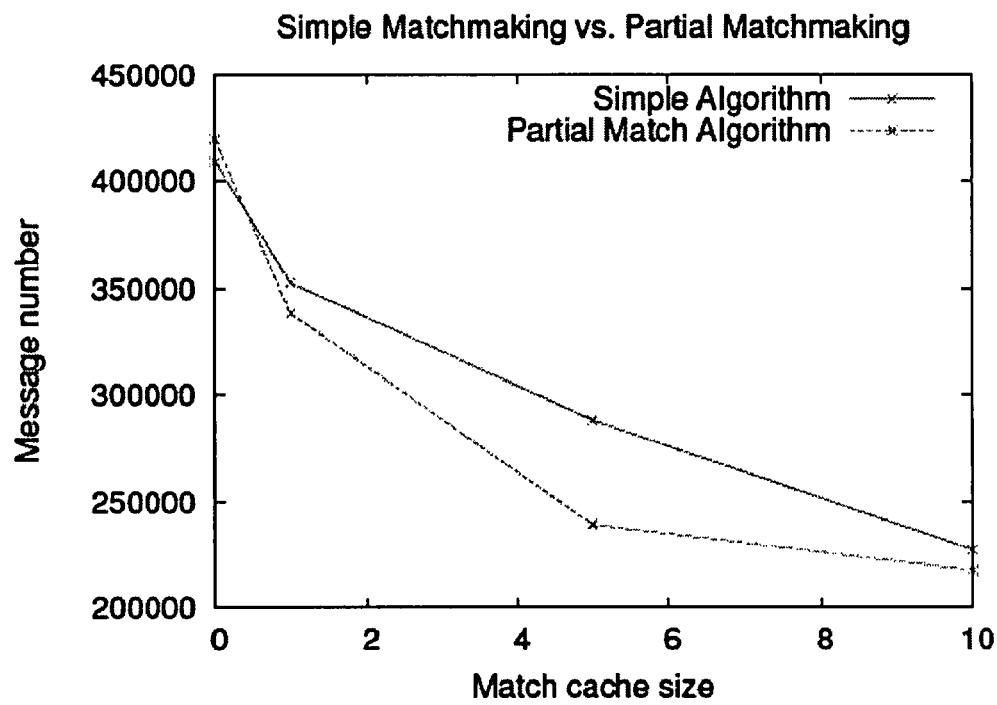
FIG. 22 is a graph depicting the number of messages as a function of matching cache size, depicting the effect of using simple and complex matching requests.
Figure 23:
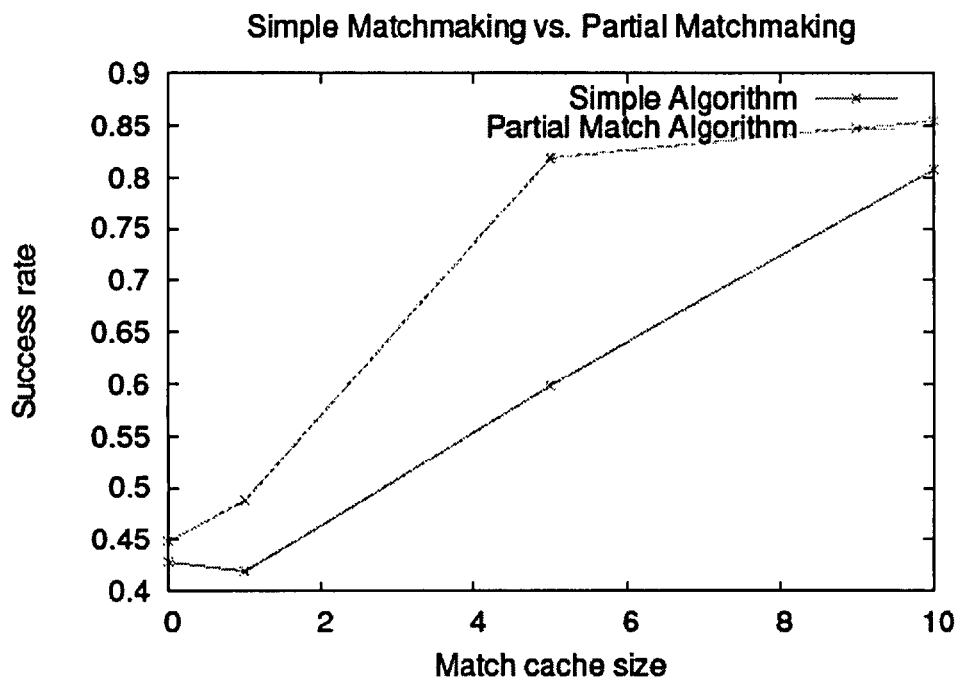
FIG. 23 is a graph depicting the success rate as a function of matching cache size, depicting the effect of using simple and complex matching requests.
Figure 24:
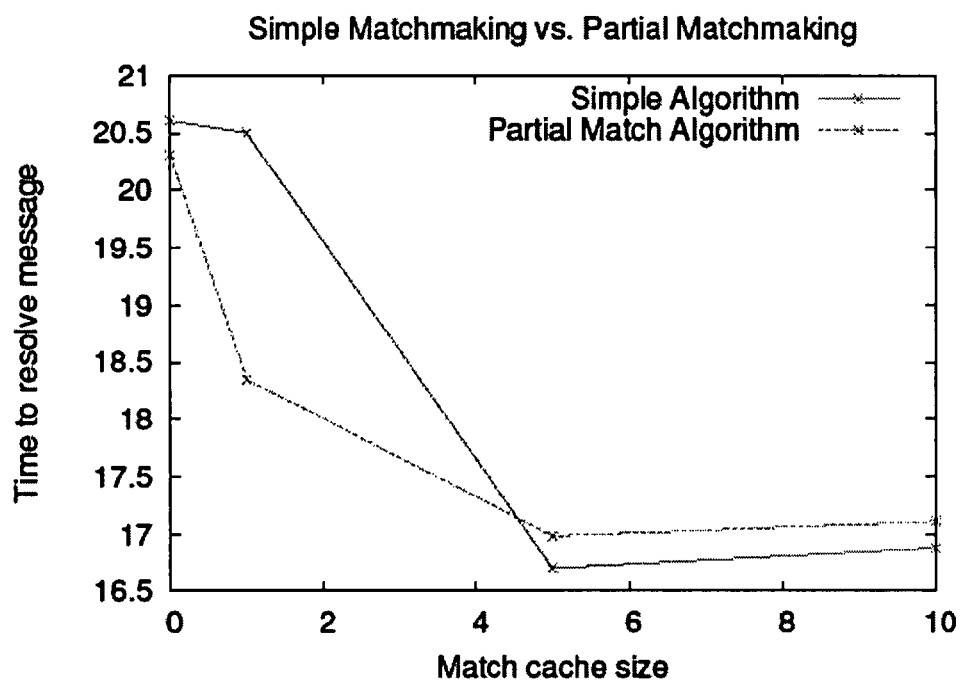
FIG. 24 is a graph depicting the time for matchmaking as a function of matching cache size, depicting the effect of using simple and complex matching requests.
Figure 25:
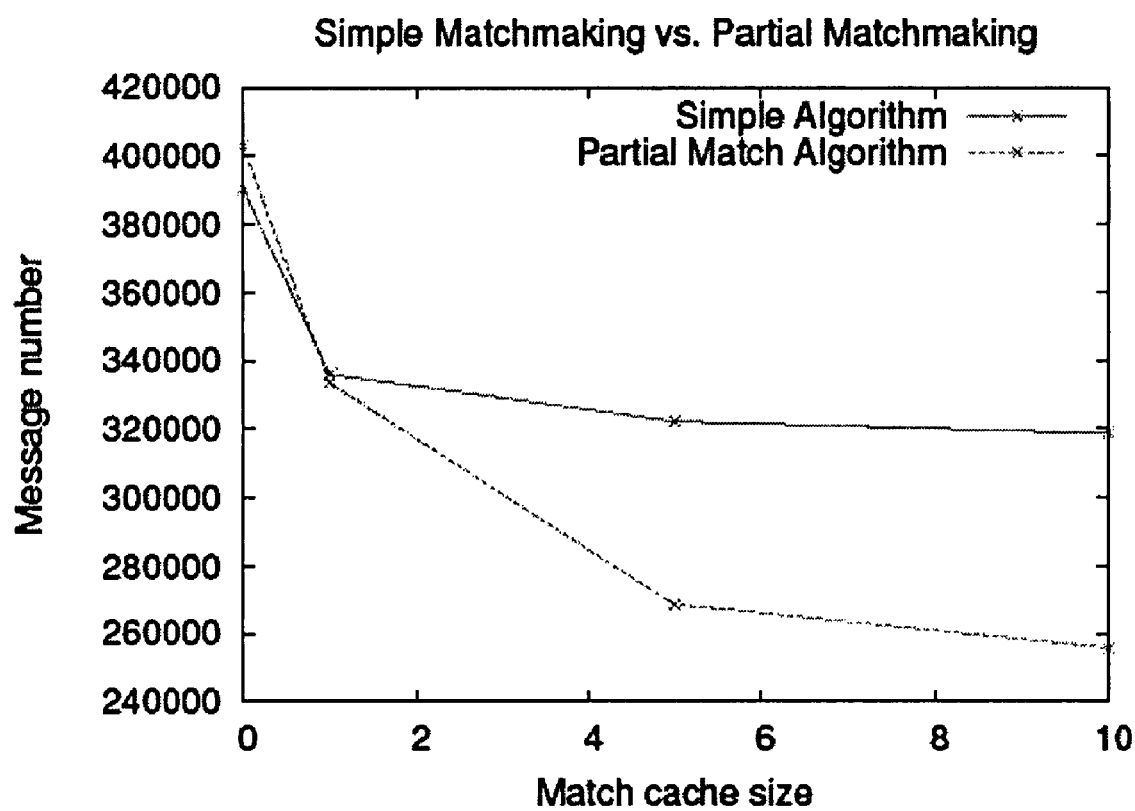
FIG. 25 is a graph depicting the number of messages as a function of matching cache size, depicting the effect of using simple and complex matching requests.

As described above, in relation to FIG. 4, a complex matching request that hosts a list of nodes that has been identified as potential nodes to a requested matching indication may be used for improving the matching performance of multi-node matchmaking. The effect of using such a complex matching request for matching a group of three nodes is depicted in FIGS. 20, 21, and 22. The effect of using such a complex matching request for matching a group of four nodes is depicted in FIGS. 23, 24, and 25.

As depicted in FIGS. 20-25, using a complex matching request instead of a simple matching request improves the success rate and reduces the number of matching requests sent. In examining the time for matchmaking success, it appears that if more matching requests are cached in one or more of the nodes, using simple matching requests outperforms using complex matching requests. Such an outperforming is caused as by using complex matching requests more matches are found.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A multi-node network, comprising:
a plurality of nodes, at least one of said node comprising a local cache configured for storing a plurality of matching indications at least some of which associated with a plurality of potential nodes;
wherein a receiving node of said plurality of nodes is configured for receiving a matching request having a requested matching indication associated with an address of an additional node of said plurality of nodes, said receiving node being configured for identifying a match between said receiving node and at least one of said plurality of associated potential nodes by matching said requested matching indication and said stored matching indications and for automatically establishing a multi-node session for a common activity between at least one of said receiving node and said at least one of said plurality of associated potential nodes according to said match thereby allowing a plurality of remote users to participate in a common activity.

2. The multi-node system of claim 1, wherein said requested matching indication is associated with a list of a plurality of additional node addresses, said receiving node being configured for adding its address to said list and propagating said matching request with said addition to at least one said associated address.

3. The multi-node system of claim 1, wherein each said node is a mobile communication device.

4. The multi-node system of claim 1, wherein said matched nodes are configured for establishing a symmetric communication.

5. A node of a network comprising a plurality of nodes, comprising:
a matching cache configured for storing a plurality of matching indications at least one of which associated with a potential network node;
a communication receiver configured for receiving a matching request defining a requested matching indication associated with an indication of a requesting network node;
a matching module configured for identifying a match between said requesting network node and at least one of said potential network nodes by matching said requested matching indication and at least one of said plurality of matching indications; and
a communication transmitter configured for automatically establishing a multi-node session between at least one of said matched network nodes and said node according to said match thereby allowing a plurality of remote users to participate in a common activity.

6. The node of claim 5, wherein said informing comprises forwarding said matching request to at least one said matched network nodes.

7. The node of claim 5, wherein each said potential network node is a mobile terminal, said mobile terminal being a member of the group consisting of: a user terminal, a laptop, a cellular phone, a dual-mode phone, and a personal digital assistant (PDA).

8. The node of claim 5, wherein a member of said plurality of nodes is configured for dynamically changing its address.

9. The node of claim 5, wherein if said matching fails, said communication transmitter is configured for forwarding said matching request to at least one said associated potential network node.

10. The node of claim 5, wherein said matching indication defines a member of the group consisting at least one of: a readiness to participate in a communication session, a readiness to participate in a gaming session, a readiness to allocate a resource, and a readiness to use a resource.

11. The node of claim 5, wherein said matching indication defines at least one characteristic of one of said plurality of potential nodes, said at least one characteristic define a member of the group consisting of:

a geographic location, a skill rank, a type, a display type, a central processing unit (CPU) type, a display card type, and an operation system.

12. The node of claim 5, wherein each said stored matching indication is associated with a termination indicator defining at least one criterion for eliminating said stored matching indication, said matching module configured for ignoring said stored matching indication if said criterion is met.

13. The node of claim 12, wherein said criterion defines a member of the group consisting at least one of: a maximum value of forwarding, a termination period, a time to live, a number of cycles, the size of the space in said matching cache a number of matches made, and a time of day.

14. The node of claim 5, further comprising a matching request creating module for creating a new matching request, said communication transmitter being configured for propagating said new matching request around the network.

15. The node of claim 14, further comprising an incentive generator module configured for limiting said creation.

16. A method for establishing a multi-node session between at least two nodes of a multi-node network, said method comprising:

a) storing a plurality of matching indications each associated with an address of a potential node, in a first node the multi-node network;

b) receiving at said first node a request defining a requested matching indication associated with a second node;

c) identifying a match between at least one of said stored potential nodes and said second node by matching between said requested matching indication and said plurality of matching indications to; and d) automatically establishing a multi-node session between at least one of said matched associated potential nodes and said second node according to said match thereby allowing a plurality of remote users to participate in a common activity.

17. The method of claim 16, further comprising establishing a connection between said second node and said matched potential nodes.

18. The method of claim 17 wherein said connection is a peer-to-peer (P2P) connection.

19. The method of claim 16, wherein said informing comprises forwarding said matching request to at least one of said matched potential nodes.

20. The method of claim 16, wherein at least one node of the multi-node network is a mobile communication terminal.

21. The method of claim 16, wherein if said matching is not found, further comprising propagating said matching request to at least one of said associated addresses, said c) and d) being performed by said propagated nodes.

22. The method of claim 16, wherein said request defining a list of addresses of second nodes, further comprising adding an address of said first node to said list before said informing, said informing comprises propagating said request with said addition said associated addresses, said c) and d) being performed by said propagated nodes.

23. A method for establishing a multi-node session, comprising:

a) distributing first and second matching requests respectively from first and second nodes of the multi-node network to a plurality of third nodes of the multi-node network, said first and second matching requests having a common matching indication;

b) locally caching said first matching indication and an identifier of said first network node in at least one of said plurality of third nodes;

c) identifying a match by locally matching said matching indications at one of said plurality of third nodes;

d) automatically establishing a multi-node session for a common activity between said first and second nodes according to said match thereby allowing a plurality of remote users to participate in a common activity.

24. The node matching method of claim 23, wherein said distributing is performed by a search algorithm, said search algorithm being a member of the group consisting at least one of: a teeming algorithm and a flooding algorithm.

25. The method of claim 23, wherein said establishing further comprising establishing a connection between said first and second nodes.

* * * * *